US009264258B2

(12) United States Patent　　(10) Patent No.: US 9,264,258 B2
Fish　　(45) Date of Patent: Feb. 16, 2016

(54) PRESENCE AND GEOGRAPHIC LOCATION NOTIFICATION BASED ON A SETTING

(75) Inventor: Edmund J. Fish, Great Falls, VA (US)

(73) Assignee: FACEBOOK, INC., Menlo Park, CA (US)

( * ) Notice: Subject to any disclaimer, the term of this patent is extended or adjusted under 35 U.S.C. 154(b) by 0 days.

(21) Appl. No.: 13/615,468

(22) Filed: Sep. 13, 2012

(65) Prior Publication Data

US 2013/0066997 A1　　Mar. 14, 2013

Related U.S. Application Data

(63) Continuation of application No. 11/747,730, filed on May 11, 2007, which is a continuation of application No. 10/849,528, filed on May 20, 2004, now Pat. No. 7,219,303.

(60) Provisional application No. 60/471,743, filed on May 20, 2003.

(51) Int. Cl.
*G06F 3/00*　　(2006.01)
*H04L 12/58*　　(2006.01)
(Continued)

(52) U.S. Cl.
CPC ............ *H04L 12/581* (2013.01); *G06Q 10/107* (2013.01); *H04L 12/587* (2013.01); *H04L 29/06* (2013.01); *H04L 51/04* (2013.01); *H04L 51/24* (2013.01); *H04L 67/04* (2013.01); *H04L 67/18* (2013.01); *H04L 67/24* (2013.01); *H04L 67/26* (2013.01); *H04L 67/306* (2013.01); *H04L 67/36* (2013.01); *H04L 69/329* (2013.01); *H04W 4/02* (2013.01); *H04W 4/023* (2013.01); *H04W 4/06* (2013.01); *H04W 4/20* (2013.01); *H04L 63/08* (2013.01)

(58) Field of Classification Search
CPC ....................................................... H04L 67/24
USPC .......................... 715/733, 741, 744, 745, 747
See application file for complete search history.

(56) References Cited

U.S. PATENT DOCUMENTS 5,261,102 A　　11/1993　Hoffman
5,329,578 A　　7/1994　Brennan et al.
(Continued)

FOREIGN PATENT DOCUMENTS

WO　WO 03/003694　　1/2003
WO　WO 03/030003　　4/2003

OTHER PUBLICATIONS

International Application No. PCT/US04/15872 Search and Examination Report Dated Oct. 24, 2005 (7 Pages).
(Continued)

*Primary Examiner* — Andrey Belousov
(74) *Attorney, Agent, or Firm* — Keller Jolley Preece

(57) ABSTRACT

A user of an instant messaging system may store names of other users of the instant messaging system on a participant list (which may be referred to as a "buddy list"), and the names may be categorized into one or more groups. Similarly, a user of a mobile device, such as a mobile telephone, may store contact information about people on the mobile device. Information describing the on-line presence of the user within the instant messaging system or the geographic location of a mobile device, such as a mobile telephone associated with the user, may be disseminated to users on the participant list or to people on the contact list based on notification information that is associated with groups of users or contacts.

17 Claims, 16 Drawing Sheets

(51) Int. Cl.
  *G06Q 10/10* (2012.01)
  *H04L 29/06* (2006.01)
  *H04W 4/02* (2009.01)
  *H04W 4/06* (2009.01)
  *H04W 4/20* (2009.01)
  *H04L 29/08* (2006.01)

(56) References Cited

U.S. PATENT DOCUMENTS

| | | | |
|---|---|---|---|
| 5,515,491 | A | 5/1996 | Bates et al. |
| 5,652,789 | A | 7/1997 | Miner et al. |
| 6,115,709 | A | 9/2000 | Gilmour |
| 6,154,172 | A | 11/2000 | Piccionelli et al. |
| 6,205,478 | B1 | 3/2001 | Sugano |
| 6,253,202 | B1 | 6/2001 | Gilmour |
| 6,269,369 | B1 | 7/2001 | Robertson |
| 6,414,635 | B1 | 7/2002 | Stewart et al. |
| 6,433,735 | B1 | 8/2002 | Bloebaum et al. |
| 6,463,292 | B1 | 10/2002 | Rahman |
| 6,466,654 | B1 | 10/2002 | Cooper et al. |
| 6,496,776 | B1 | 12/2002 | Blumberg et al. |
| 6,504,503 | B1 | 1/2003 | Saint-Hilaire et al. |
| 6,539,080 | B1 | 3/2003 | Bruce et al. |
| 6,542,750 | B2 | 4/2003 | Hendrey et al. |
| 6,549,612 | B2 | 4/2003 | Gifford et al. |
| 6,564,261 | B1 | 5/2003 | Gudjonsson et al. |
| 6,583,813 | B1 | 6/2003 | Enright et al. |
| 6,594,576 | B2 | 7/2003 | Fan et al. |
| 6,659,872 | B1 | 12/2003 | Kaufman et al. |
| 6,708,203 | B1 | 3/2004 | Makar |
| 6,714,791 | B2 * | 3/2004 | Friedman ............ 455/456.1 |
| 6,731,323 | B2 | 5/2004 | Doss et al. |
| 6,791,583 | B2 | 9/2004 | Tang et al. |
| 6,968,216 | B1 | 11/2005 | Chen et al. |
| 7,027,836 | B2 | 4/2006 | Zacks et al. |
| 7,117,445 | B2 | 10/2006 | Berger |
| 7,123,695 | B2 | 10/2006 | Malik |
| 7,124,370 | B2 | 10/2006 | Fish |
| 7,139,797 | B1 | 11/2006 | Yoakum et al. |
| 7,216,147 | B2 | 5/2007 | Blagsvedt et al. |
| 7,219,303 | B2 | 5/2007 | Fish |
| 7,225,257 | B2 | 5/2007 | Aoike et al. |
| 7,237,201 | B2 | 6/2007 | Fish |
| 7,240,093 | B1 | 7/2007 | Danieli et al. |
| 7,266,190 | B1 | 9/2007 | Mullis et al. |
| 7,373,428 | B1 | 5/2008 | Armstrong et al. |
| 7,379,704 | B2 | 5/2008 | Parker et al. |
| 7,412,400 | B1 | 8/2008 | Bhela et al. |
| 7,603,411 | B1 | 10/2009 | Davies et al. |
| 7,751,826 | B2 | 7/2010 | Gardner et al. |
| 7,886,232 | B2 | 2/2011 | Fish |
| 7,995,742 | B2 | 8/2011 | Lenard |
| 8,108,469 | B2 | 1/2012 | Kent et al. |
| 8,352,872 | B2 | 1/2013 | Fish |
| 8,605,867 | B2 | 12/2013 | Malik |
| 2002/0023132 | A1 | 2/2002 | Tomabene |
| 2002/0049806 | A1 | 4/2002 | Gatz |
| 2002/0109732 | A1* | 8/2002 | Ward et al. ............ 345/810 |
| 2002/0120687 | A1 | 8/2002 | Diacakis |
| 2002/0165898 | A1 | 11/2002 | Duffy et al. |
| 2002/0169539 | A1 | 11/2002 | Menard et al. |
| 2002/0184089 | A1 | 12/2002 | Tsou et al. |
| 2002/0196280 | A1 | 12/2002 | Bassett et al. |
| 2003/0036949 | A1 | 2/2003 | Kaddeche et al. |
| 2003/0046296 | A1 | 3/2003 | Doss et al. |
| 2003/0050986 | A1 | 3/2003 | Matthews et al. |
| 2003/0060214 | A1 | 3/2003 | Hendrey et al. |
| 2003/0065788 | A1 | 4/2003 | Salomaki |
| 2003/0084170 | A1 | 5/2003 | deJong et al. |
| 2003/0088824 | A1 | 5/2003 | Ayan |
| 2003/0119522 | A1 | 6/2003 | Barclay et al. |
| 2003/0135494 | A1 | 7/2003 | Phelan et al. |
| 2003/0174814 | A1 | 9/2003 | Diacakis |
| 2003/0229687 | A1 | 12/2003 | Ohno et al. |
| 2004/0010808 | A1 | 1/2004 | DeCarmo |
| 2004/0059781 | A1 | 3/2004 | Yoakum et al. |
| 2004/0064567 | A1 | 4/2004 | Doss et al. |
| 2004/0073614 | A1 | 4/2004 | Blohm |
| 2004/0193686 | A1 | 9/2004 | Blagsvedt et al. |
| 2004/0201623 | A1 | 10/2004 | Hamilton et al. |
| 2004/0201668 | A1 | 10/2004 | Matsubara et al. |
| 2004/0203888 | A1 | 10/2004 | Mikan |
| 2004/0268265 | A1 | 12/2004 | Berger |
| 2005/0071435 | A1 | 3/2005 | Karstens |
| 2005/0080867 | A1 | 4/2005 | Malik et al. |
| 2005/0091327 | A1 | 4/2005 | Koch |
| 2005/0198321 | A1 | 9/2005 | Blohm |
| 2006/0143569 | A1 | 6/2006 | Kinsella |
| 2006/0190600 | A1 | 8/2006 | Blohm et al. |
| 2007/0082680 | A1 | 4/2007 | Fish |
| 2007/0288852 | A1 | 12/2007 | Fish |
| 2009/0172564 | A1 | 7/2009 | Fish |
| 2011/0126109 | A1 | 5/2011 | Fish |
| 2013/0005361 | A1 | 1/2013 | Fish |
| 2013/0065573 | A1 | 3/2013 | Fish |
| 2013/0065574 | A1 | 3/2013 | Fish |
| 2013/0065609 | A1 | 3/2013 | Fish |
| 2013/0066996 | A1 | 3/2013 | Fish |

OTHER PUBLICATIONS

MessageVine; http://www.messagevine.com/index/htm; 1 page; (Sep. 27, 2004).

Instant Messaging Planet; Inching Toward Mobile IM; http://www.messagevines.com/news/mm/Inching TowMob02282003 .htm; pp. 1-3; (Sep. 27, 2004).

MOBIC Mobile Community; MessageVine Introduces Mobil IM and Presence Solution Supporting Web Services; http://www.messagevine.com/news/mm/IntroducesMobileIM05262002.htm; 1 page; (Jun. 26, 2002).

Pfeiffer, Eric W.; WhereWare; http://www.technologyreves.corn/articles/pfeiffer0903.asp?p=0; pp. 1-11; (Aug. 27, 2003).

OMA Open Mobile Alliance, Spotlight; http://www.openmobilealliance.org/; 1 page; (Sep. 27, 2004).

OMA Open Mobile Alliance, About Open Mobile Alliance; http://www.openmobilealliancesorg/about OMA/index.html; pp. 1-2; (Sep. 27, 2004).

OMA Technical Section, Presence and Availability Working Group; http://www.openmobilealliance.org/tech/wg committees/pag. html; pp. 1-2; (Sep. 27, 2004).

Axismobile; http://www.axismobile.com ; 1 page; (Sep. 23, 2003).

Axismobile—Technology; http://www.axismobile.com/Technology.html; p. 2 of 2; (Sep. 23, 2003); and 1 page of Narrative describing the Axis Engine.

AxisMobile, Home, Optimized Messaging Solutions; http://www.axismobile.com/; 1 page; (Sep. 27, 2004).

AxisMobile, Products and Solutions >Entertainment; http://www.axismobilescom/entertain.html; 1 page (Sep. 27, 2004).

AxisMobile Optimized Messaging Solutions; Axis entertainment; 1 page; retrieved on Sep. 30, 2004.

Openwave—Inside the Wave—Find New Subscribers with Location Services; http://www.openwave.com/us/openwaveiq/inside the wave/2002/october/location.htm; pp. 1-2 (Oct. 2002).

Friend Finder, Profit from the Hottest Application in the Wireless Market; SignalSoft Wireless Location Services; 2 pages; (2002).

McCabe, Eric; SignalSoft's FriendFinderTM a Case Study; www.signalsoftcorp.com; 15 pages; (2001).

Peter O'Kelly, "Microsoft Windows Messenger: A Unified Real-Time Communications User Experience with Significant Customer Service Potential," Patricia Seybold Group—Strategic Consultants & Thought Leaders, Jul. 26, 2001.

European Search Report Issued in EP04752815.3 on Sep. 24, 2009, 6 Pages.

U.S. Appl. No. 10/849,528, Jun. 3, 2005, Office Action.
U.S. Appl. No. 10/849,528, Dec. 28, 2005, Office Action.
U.S. Appl. No. 10/849,528, Aug. 9, 2006, Office Action.
U.S. Appl. No. 10/849,528, Jan. 10, 2007, Notice of Allowance.
U.S. Appl. No. 10/849,565, Jul. 11, 2005, Office Action.
U.S. Appl. No. 10/849,565, Jan. 30, 2006, Office Action.

(56) References Cited

OTHER PUBLICATIONS

U.S. Appl. No. 10/849,565, Apr. 25, 2006, Advisory Action.
U.S. Appl. No. 10/849,565, Jun. 7, 2006, Notice of Allowance.
U.S. Appl. No. 10/849,556, Jul. 11, 2005, Office Action.
U.S. Appl. No. 10/849,556, Jan. 18, 2006, Office Action.
U.S. Appl. No. 10/849,556, Jul. 20, 2006, Office Action.
U.S. Appl. No. 10/849,556, Jan. 10, 2007, Notice of Allowance.
U.S. Appl. No. 10/849,556, Apr. 4, 2007, Notice of Allowance.
U.S. Appl. No. 11/531,101, Apr. 1, 2009, Office Action.
U.S. Appl. No. 11/531,101, Dec. 15, 2009, Office Action.
U.S. Appl. No. 11/531,101, Jun. 2, 2010, Office Action.
U.S. Appl. No. 11/531,101, Sep. 29, 2010, Notice of Allowance.
U.S. Appl. No. 11/747,730, Feb. 23, 2010, Office Action.
U.S. Appl. No. 11/747,730, Jul. 22, 2010, Office Action.
U.S. Appl. No. 11/747,730, Jan. 14, 2011, Office Action.
U.S. Appl. No. 11/747,730, Jun. 22, 2011, Office Action.
U.S. Appl. No. 11/747,730, Feb. 7, 2012, Office Action.
U.S. Appl. No. 11/747,730, Sep. 20, 2012, Office Action.
U.S. Appl. No. 11/747,730, May 10, 2013, Office Action.
U.S. Appl. No. 11/747,730, Nov. 14, 2013, Office Action.
U.S. Appl. No. 11/747,745, Nov. 13, 2009, Office Action.
U.S. Appl. No. 11/747,745, Jun. 11, 2010, Office Action.
U.S. Appl. No. 11/747,745, Jan. 3, 2012, Office Action.
U.S. Appl. No. 11/747,745, Aug. 2, 2012, Notice of Allowance.
U.S. Appl. No. 11/747,745, Oct. 3, 2012, Notice of Allowance.
U.S. Appl. No. 13/015,818, Jun. 12, 2012, Office Action.
U.S. Appl. No. 13/015,818, Nov. 30, 2012, Office Action.
U.S. Appl. No. 13/015,818, Aug. 1, 2013, Office Action.
U.S. Appl. No. 13/615,464, Dec. 4, 2013, Office Action.
U.S. Appl. No. 13/615,483, Mar. 13, 2013, Office Action.
U.S. Appl. No. 13/615,485, Feb. 15, 2013, Office Action.
U.S. Appl. No. 13/612,842, Jan. 17, 2013, Office Action.
U.S. Appl. No. 13/612,842, Oct. 25, 2013, Office Action.
U.S. Appl. No. 13/615,499, Jan. 17, 2013, Office Action.
U.S. Appl. No. 11/747,730, Feb. 19, 2014, Notice of Allowance.
U.S. Appl. No. 13/015,818, Jan. 22, 2014, Office Action.
U.S. Appl. No. 13/015,818, Sep. 25, 2014, Office Action.
U.S. Appl. No. 13/615,464, Jun. 25, 2014, Office Action.
U.S. Appl. No. 13/612,842, Jan. 14, 2014, Notice of Allowance.
U.S. Appl. No. 13/612,842, Feb. 14, 2014, Notice of Allowance.
U.S. Appl. No. 13/015,818, Oct. 10, 2015, Notice of Allowance.
U.S. Appl. No. 13/615,464, Sep. 24, 2015, Office Action.

* cited by examiner

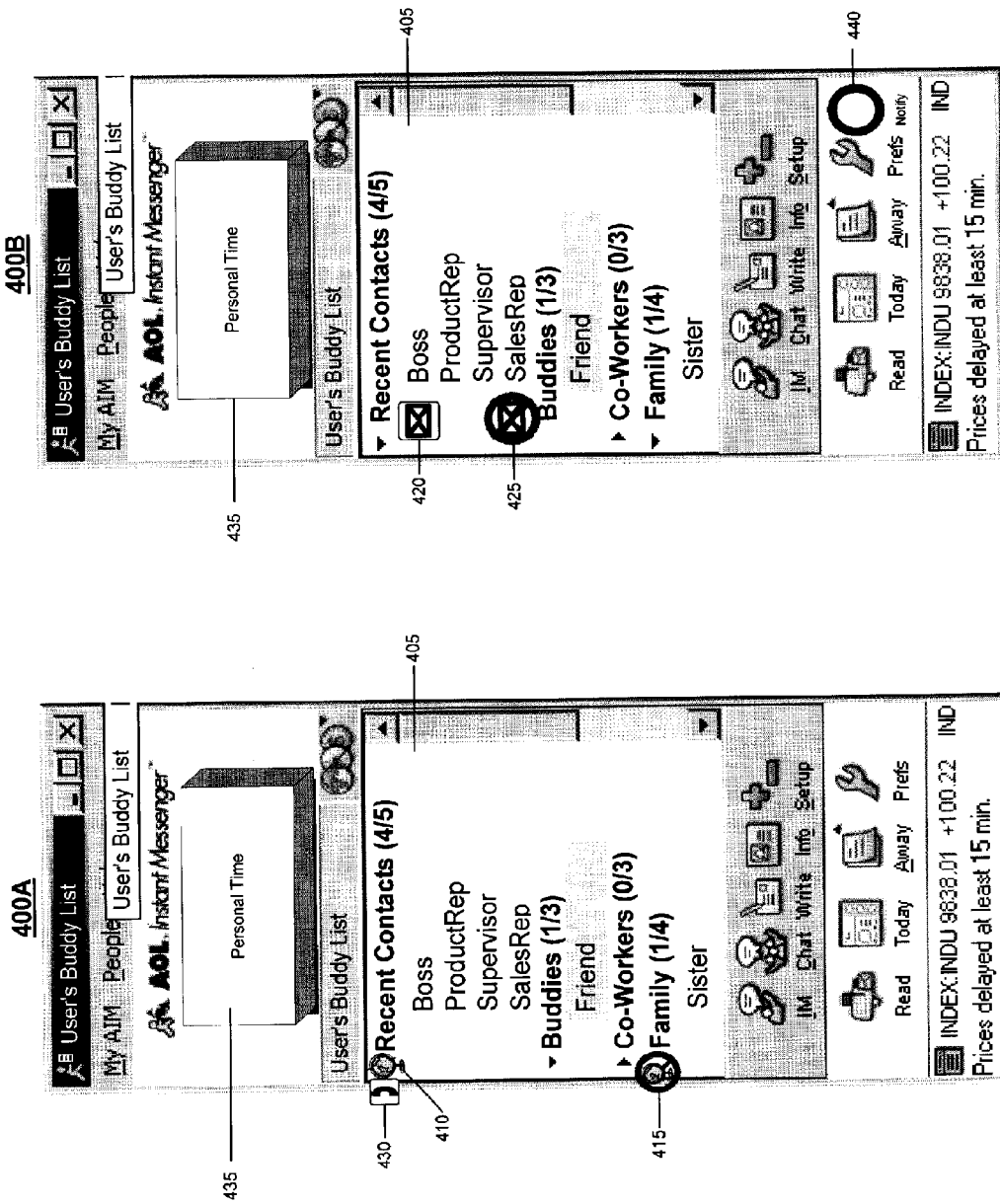

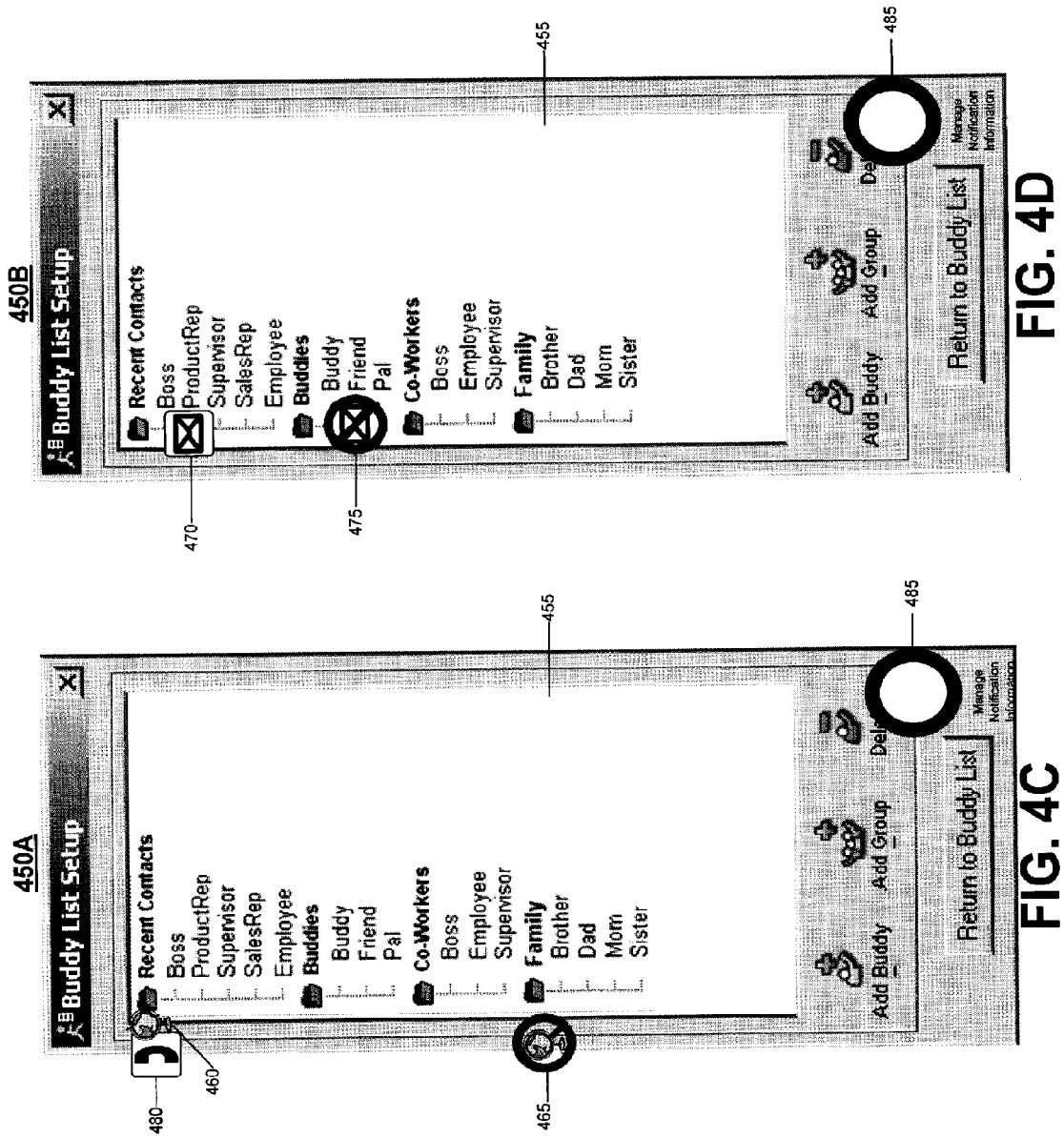

PRESENCE AND GEOGRAPHIC LOCATION NOTIFICATION BASED ON A SETTING

CROSS REFERENCE TO RELATED APPLICATIONS

The present application is a continuation of U.S. patent application Ser. No. 11/747,730, entitled "Presence and Geographic Location Notification Based on a Setting" filed on May 11, 2007, which is a continuation of U.S. patent application Ser. No. 10/849,528, entitled "Presence and Geographic Location Notification Based on a Setting" filed May 20, 2004 now issued as U.S. Pat. No. 7,219,303, which claims priority to U.S. provisional application No. 60/471,743, filed on May 20, 2003. Each of the aforementioned patent(s) and application(s) are hereby incorporated by reference in their entirety.

TECHNICAL FIELD

This description relates to controlling distribution of notifications of presence and geographic location of users of systems such as instant messaging and cellular telephone systems.

BACKGROUND

On-line services may provide users with the ability to send and receive instant messages. Instant messages are private on-line conversations between two or more people who have access to an instant messaging service, who have installed communications software necessary to access and use the instant messaging service, and who generally have access to information reflecting the on-line status of other users.

SUMMARY

In one general aspect, to determine whether to provide notification information that corresponds to a communication identity, notification setting information that identifies a temporal condition is accessed. The notification setting information includes at least one temporal period during which notification information is to be provided or withheld, and includes a beginning and an end of the at least one temporal period that are specified in the notification setting information in advance of the beginning of the temporal period. A determination is made as to whether the temporal condition is satisfied, and dissemination of notification information related to the communications identity is controlled based on whether the temporal condition is satisfied.

Implementations may include one or more of the following features. For example, notification information may indicate whether the communications identity is available to communicate, logged on to a particular communications system, or logged on to an instant messaging system, and also may indicate a geographic location of the communications identity.

A granularity at which the geographic location is disseminated may be controlled based on notification setting information, and a recipient of the geographic location may further control the granularity of the geographic location displayed. The granularity at which the geographic location is disseminated or displayed may include one of a street address, a city, a metropolitan area, an area within a metropolitan area, a region of a country, or a country. The granularity at which the geographic location is disseminated also may be controlled based on notification setting information that is associated with a participant list or with a category of communications identities on a participant list.

One of many participant lists may be accessed. Each participant list may identify multiple communications identities designated by a user. Accessing notification setting information may include accessing notification setting information for one or more participant lists that identifies a temporal condition for notifying communications identities on a participant list such that the temporal condition includes at least one temporal period during which notification information is to be provided or withheld. Controlling dissemination may include controlling dissemination of notification information relating to communications identities identified on the at least one of many participant lists.

Different temporal conditions may be associated with different ones of the participant lists. Determining whether a temporal condition is satisfied may include doing so for at least one but less than all of the participant lists.

Controlling dissemination comprises providing notification information or restricting the provision of notification information. Notification information may be transmitted between a mobile communications device capable of transmitting voice communications and an instant messaging system.

Notification setting information may be stored on the mobile communications device or on the instant messaging system. Notification setting information may include notification information that is associated with one of multiple categories of notification information. Notification setting information also may be associated with a hierarchy of notification categories. One or more of the categories may be a user-definable category, and one or more of the categories may be associated with a participant list that identifies multiple communications identities designated by a user.

An alert may be displayed that indicates the notification setting information that is to be applied based on the temporal condition, and a user may be prompted to modify the notification setting information.

When controlling dissemination of notification information includes denying dissemination of notification information, an incoming communication associated with a user corresponding to the notification information may be detected and the user may be alerted to the incoming communication. The incoming communication may include an instant message sent to the user and also may include an attempt to determine the geographical location of the user or other information about the user.

When the temporal condition is satisfied such that availability of the user to communicate is hidden and the user indicates that a message is to be sent, a prompt may be displayed to alert the user that the availability of the user to communicate will be revealed when the message is sent.

When the temporal condition applies to all of several participant lists, each participant list may identify multiple communications identities designated by a user. The temporal condition may apply to all individuals included in a participant list associated with the user. The temporal condition applied to at least one individual included in a participant list associated with the user may differ from a temporal condition applied to at least one other individual included in the participant list.

Status information may be accessed. The status information may correspond to the availability of a communications identity included on a participant list that has multiple communications identities designed by the user. Notification setting information may be accessed for one or more participant lists associated with the communications identity. The notification setting information may indicate a temporal condition for notifying communication identities on one or more of the participant lists. The temporal condition may include a temporal period during which notification information is to be restricted. The participant list may be passively configured to persistently conceal the status of the communications identity in response to a determination that the temporal condition is not satisfied. Persistently concealing the status of the communications identity may include indicating that availability information for the communications identity is unknown or that the communications identity is not available to communicate. Persistently concealing the status of the communications identity also may include indicating that the communications identity is not logged onto an instant message system used by the communications identity when the communications identity is logged onto the instant message system.

The communications identity may be a first communications identity, and information may be accessed that indicates that a first communications identity associated with a first mobile device is associated with a second communications identity. The first communications identity and the second communications identity may correspond to the same natural person. Geographical location information that is associated with the first mobile device may be received. A participant list may be accessed that identifies communications identities designated by a user that are associated with the second communications identity. The geographical location information associated with the first mobile device may be provided to the communications identities of the participant list associated with the second communications identity. The participant list may constitute a contact list of a mobile device capable of transmitting and receiving voice communications or may be a participant list of an instant messaging system.

Delegation information associated with a communications identity may be accessed. The delegation information may include multiple categories of communications identities and, for at least one of the multiple categories, may identify notification information modifications to be controlled. A modification of notification information regarding the notification setting information may be received from a user identity associated with a category of the multiple categories. Delegation information associated with the category may be accessed, and a determination may be made as to whether the user identity is permitted to perform the modification based on the delegation information associated with the category. The modification to the notification setting information is only permitted when the user identity is permitted to perform the modification.

The multiple categories may include at least two categories of the multiple categories that are arranged in a hierarchical relationship such that a lower category is related to a higher category. The delegation information associated with the higher category also may be associated with the lower category. The user identity may be associated with the lower category. If so, the modification to the notification setting information may only be permitted when the user identity is permitted to perform the modification based on a determination as to whether the user identity is permitted to perform the modification based on the delegation information associated with the higher category.

The multiple categories may include a government category, a financier category, and a user category. The financier category may include a business enterprise, and the user category may include an employee. The financier category also may include a parent, and the user category may include a child of the parent.

Implementations of the techniques discussed above may include a method or process, a system or apparatus, or computer software on a computer-accessible medium.

The details of one or more of the implementations are set forth in the accompanying drawings and description below. Other features will be apparent from the description and drawings, and from the claims.

DESCRIPTION OF DRAWINGS

FIGS. 4A-4D are diagrams of user interfaces for participant lists that indicate the dissemination of notification information in an instant messaging system

DETAILED DESCRIPTION

A user of an instant messaging system controls dissemination of notification information related to the user's on-line presence based on a notification setting that identifies a temporal period during which notification of the user's on-line presence is provided (or withheld) when other external conditions, such as characteristics of users or devices with which the user's on-line presence is to be shared, are satisfied. When the temporal condition of the notification setting and the external conditions are satisfied, other users are provided with notification of the user's on-line presence (or not if the on-line presence is withheld according to the notification setting). Different notification settings having different temporal conditions also may be associated with each of several categories of users. In such a case, when the temporal condition of a particular notification setting is satisfied, users who are associated with the category are notified. In a similar manner, the geographic location of a mobile communications device, such as a mobile telephone, associated with a user is disseminated to others based on a notification setting having a temporal condition. The dissemination of the on-line presence or the geographic location of a user may occur between an instant messaging system and the mobile communications system associated with the mobile communications device of the user. For example, notifications of the on-line presence may be sent to the mobile communications system from the instant messaging system, and the notifications of the geographic location may be sent to the instant messaging system from the mobile communications system.

Figure 1:
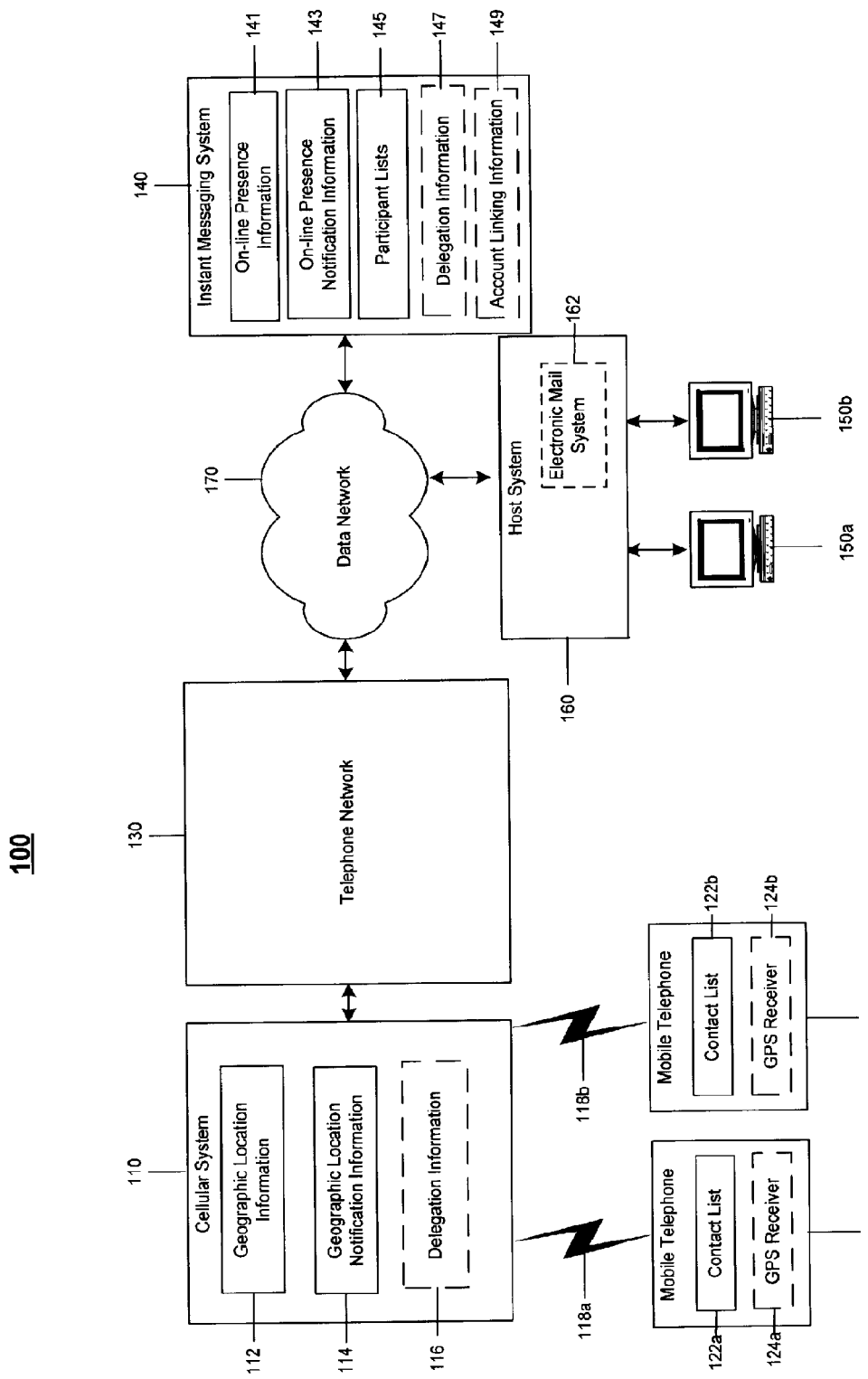
FIG. 1 is a block diagram of a communications system capable of controlling dissemination of notification information related to an on-line presence and a geographic location associated with a user.

FIG. 1 illustrates a communications system 100 capable of controlling dissemination of geographic location or on-line presence information for a user to a communications identity. In general, a geographic location of a user is based on detecting the geographic location of a mobile telephone, a cellular telephone or another device associated with the user, whereas on-line presence of the user is based on detecting that the user has used a computer, a mobile computing device, or another device to sign on to a host system or an instant messaging system accessible through a data network. Information related to a geographic location and an on-line presence of a communications identity collectively may be referred to as notification information. The system 100 enables the user to control the dissemination of notification information, for example, based on the group identity of the communications identity to whom the disclosure of notification information is to be made or a temporal constraint directly or indirectly associated with the communications identity.

In particular, the communications system 100 includes a cellular system 110 capable of communicating with an instant messaging system 140 over a telephone network 130 and a data network 170. The telephone network 130 may be a Public Switched Telephone Network (PSTN) or a Voice Over Internet Protocol (VoIP) network. The cellular system 110 also is capable of communicating with mobile telephones 120a and 120b, respectively, over wireless communication pathways 118a and 118b. When a telephone call occurs between two mobile telephones 120a and 120b, the cellular system 110 routes the telephone call.

The cellular system 110 includes geographic location information 112 that includes information on the geographic locations of each of mobile telephones 120a and 120b that use the cellular system 110. This may be accomplished, for example, by storing in a data table, list or another type of data collection an association between a unique identifier for each of the mobile telephones 120a and 120b and the geographic location of the mobile telephone 120a or 120b. A unique identifier for the mobile telephone 120a or 120b, for example, may be the telephone number of the mobile telephone, a mobile electronic identity number (MEIN), a mobile identification number (MIN), a proprietary unique identifier (such as an account identifier), or another type of identifier that uniquely identifies a mobile telephone or a mobile telephone subscriber.

The cellular system 110 also is capable of detecting, or receiving indications of, the geographic locations of the mobile telephones 120a and 120b and storing the geographic locations of the mobile telephones 120a and 120b in geographic location information 112. In one example, the geographic location of a mobile telephone 120a or 120b is received from the mobile telephone 120a or 120b itself. Additionally or alternatively, the cellular system may detect the geographic location of each of the mobile telephones 120a or 120b. For example, in one implementation, the cellular system 110 uses triangulation based on perceived distance of the mobile telephones 120a and 120b from multiple elements of the cellular system 110 (e.g., transmission towers) to determine the geographic locations of the mobile telephones 120a and 120b. The perceived distance of the mobile telephones 120a and 120b is calculated from the time needed for signals from the mobile telephones 120a and 120b to reach the cellular system 110. In any case, the cellular system 110 stores the geographic locations of the mobile telephones 120a and 120b in the geographic location information 112.

The cellular system 110 also includes geographic location notification information 114 that is used to control how the geographic location information 112 is to be disseminated. More particularly, the geographic location notification information 114 specifies communications identities (each of which typically identifies a person) with whom the geographic location information 112 is to be shared or withheld. The geographic location notification information 114 also may identify dates and times during which geographic location information 112 is to be shared or withheld. In addition, the geographic location notification information 114 may identify other conditions that determine how the geographic location information 112 is to be shared or withheld. The other conditions may consider a type of device to which the geographic location information 112 will be sent, or characteristics of users to whom the geographic location information 112 will be sent, when determining how the geographic location information 112 is to be shared or withheld.

A user of a mobile telephone 120a or 120b may control the users with whom the geographic location information for the mobile telephone 120a or 120b is shared or withheld, except as required by law or government regulation or based on delegation information 116 described later. In one example, the user may specify that the geographic location information for the mobile telephone 120a or 120b may be shared only at particular time periods or with particularly identified people, such as people identified on a contact list 122a or 122b associated with the respective mobile telephone 120a or 120b. In some implementations, copies of the contact lists 122a and 122b also are stored on the cellular system 110.

In some cases, the user's ability to control with whom the geographic location information is shared or withheld may be restricted by delegation information 116 included in the cellular system 110. The delegation information 116 may reflect a delegation model that identifies categories of users, and, for each category, identifies particular restrictions on how the geographic location information 112 is to be shared or withheld. For example, the delegation model may indicate that the geographic location information 112 is to be shared with all members of a particular category, regardless of what is, or is not, specified in the geographic location notification information 114. In one implementation, the categories may form a hierarchy in which lower categories have more restrictions on how the geographic location information 112 is to be shared or withheld than higher categories. In some implementations, the restrictions of the delegation model may override the geographic location notification information 114.

The mobile telephones 120a and 120b each include a respective contact list 122a or 122b that includes contact information for people that may be called with the mobile telephones 120a or 120b. For example, the contact list 122a or 122b may include associations of communication identities and telephone numbers. One example is the association of the communication identity "Mother" (here, a nickname is used rather than a proper name) and a telephone number that may be used to contact the communication identity. The contact list 122a or 122b enables a mobile telephone user to access contact information for use in displaying the contact information or using the contact information to initiate a telephone call. Not all of the communication identities in the contact list 122a or 122b are necessarily called with the mobile telephone. Similarly, telephone numbers not included in the contact list 122a or 122b may be called using the mobile telephone.

In some implementations, either or both of the mobile telephones 120a and 120b may be operable to notify the cellular system 110 of its geographic location. For example, each of the mobile telephones 120a and 120b may include a respective global positioning system (GPS) receiver 124a or 124b operable to determine the geographic location of the corresponding mobile telephone 120a or 120b. The geographic location determined using the GPS receiver 124a or 124b may be transmitted to the cellular system 110 over the respective wireless communication pathway 118a or 118b.

The communications system 100 also includes an instant messaging system 140. The instant messaging system 140 enables users of computers 150a and 150b to communicate with one another. Users may use one of the computers 150a or 150b to sign-in (or log-in) to a host system 160 that provides a connection to the data network 170. In one implementation, the host system 160 is operated by an Internet service provider (ISP) or an Internet access provider and also provides an electronic mail system 162. Since the instant message system 140 also is connected to the data network 170, the computers 150a and 150b are indirectly connected to the instant messaging system 140. This enables users of the computers 150a and 150b to communicate using instant messages. Alternatively or additionally, users of the computers 150a and 150b may connect directly to the data network 170, and hence to the instant messaging system 140, without connecting through the host system 160. The computers 150a and 150b may be any device that may be used to send and receive communications, such as, for example, a desktop computer, a laptop computer, a personal digital assistant (PDA), or a mobile telephone. In general, presence refers to the availability of a user of a device to communicate using the device. In some implementations, one of the mobile telephones 120a and 120b and one of the computers 150a and 150b may be the same device.

The instant messaging system 140 includes on-line presence information 141 that includes information on the on-line presence of users. On-line presence of a user refers to the availability of the user to communicate using the instant messaging system 140. In one example, a user may be designated as "present" when the user has used a computer 150a or 150b to log in to the instant messaging system 140 and is available to send and receive instant messages. As another example, a user is designated as "present" if the user is using a computer 150a or 150b and has not been inactive for a predetermined amount of time. If a user has not used the instant messaging system 140 for a particular amount of time, or if the user has explicitly indicated that the user is unavailable to communicate with the instant messaging system 140, the user may be designated as "not present." In addition, if a user is communicating and is unable to participate in further communication, the user may be designated as "not present." For example, a user who is connected to the instant messaging system 140 through a mobile telephone may be designated as "not present" when engaged in a conversation using the mobile telephone if the user is unable to simultaneously participate in instant messaging communication. Signing in to the instant messaging system 140 notifies the instant messaging system 140 of the on-line presence of the user, and the instant messaging system 140 stores that information in the on-line presence information 141.

The instant messaging system 140 includes on-line presence notification information 143 for use in controlling how on-line presence information 141 of an instant messaging user is to be disseminated. More particularly, the on-line presence notification information 143 specifies other users of the instant messaging system 140 with whom the on-line presence information 141 is to be shared or from whom the information 141 is to be withheld. The other users of the instant messaging system 140 may be referred to as communications identities. The on-line presence notification information 143 also may identify dates and times during which on-line presence information is to be shared or withheld. In addition, the on-line presence notification information 143 may identify other conditions that determine how the on-line presence information 141 is to be shared or withheld. The other conditions may consider a type of device to which the on-line presence information 141 will be sent, or characteristics of users to whom the on-line presence information 141 will be sent, when determining how the geographic location information 112 is to be shared or withheld.

A user of the instant messaging system 140 may control the users with whom the on-line presence information is shared. For example, the user is to may specify that the on-line presence information for the user be shared with all or a subset of the people on a user-created list of people with whom instant messages are exchanged. The list of people is stored in the participant lists 145 and is commonly referred to as a "buddy list."

In some cases, the user's ability to control with whom the on-line presence information is shared may be restricted by the delegation information 147. As with delegation information 116 of the cellular system 110, the delegation information 147 may be based on a delegation model that identifies categories of users and, for each category, designates restrictions on how the on-line presence information 141 is to be shared or withheld. The delegation model for delegation information 147 may be substantially the same delegation model as is used for delegation information 116 of the cellular system 110, but it does not necessarily need to be the same or substantially similar.

The instant messaging system 140 also may include account linking information 149. Each user of the instant messaging system 140 holds at least one account with the instant messaging system 140. When a user logs in to the instant messaging system 140, the user provides authentication information for one of the corresponding accounts. After the authentication information has been verified, the user appears to be logged in to the instant messaging system 140 through the account.

Relationships may be established between the accounts corresponding to the user such that when the user logs in to the instant messaging system 140 with one account, the user appears to be logged in to the instant messaging system 140 through all accounts linked to the account used to log in. In such a case, on-line presence information may be shared for all of the linked accounts. A similar feature may be present for users of the cellular system 110, in which case multiple accounts with the cellular system 110 are linked and geographic location information is shared for all linked accounts based on the geographic location of one of the linked accounts. In some systems, account information of a mobile telephone owner or user may be linked with one or more instant messaging accounts. Such account or identity linking may enable the control of the dissemination of presence information and geographic location across multiple accounts of various types used by the same person. For example, an account with the electronic mail system 162, an account with the cellular system 110, and an account with the instant messaging system held by one person may be linked together. Use of the electronic mail system 162 may lead to the dissemination of geographic location information to other users of the cellular system 110 or the instant messaging system 140.

In some implementations, the geographic location information 112 may be shared with users of the instant messaging system 140, and the on-line presence information 143 may be shared with users of the cellular system 110. For example, a user may use both a mobile telephone 120a and a computer 150a to communicate. While using the computer 150a to send and receive instant messages, the user may want to know the geographic location of a person that is identified on the contact list 122a of the mobile telephone 120a. Similarly, the user may want to know the on-line presence of a person with whom instant messages are exchanged with the instant messaging system 140 while using the mobile telephone 120a. Therefore, the telephone network 130 and the data network 170 are used to allow the cellular system 110 and the instant messaging system 140 to communicate to share geographic location information 112 and on-line presence information 143.

The host system 160 also includes an electronic mail (e-mail) system 162 that may be accessed by users of the computers 150 to send and receive electronic mail. Users of the mobile telephones 120a and 120b also may access the e-mail system to send and receive electronic mail using the mobile telephones 120a and 120b. More particularly, the mobile telephones 120a and 120b may access the electronic mail system 162 by using the cellular system 110, the telephone network 130, and the data network 170 to access the host system 160 on which the electronic mail system 162 is located. The mobile telephones 120a and 120b are capable of sending and receiving electronic mail messages using short message service (SMS) or i-mode. SMS and i-mode are protocols by which text messages, such as e-mail messages, may be sent to and from the mobile telephones 120a and 120b.

Figure 2A:
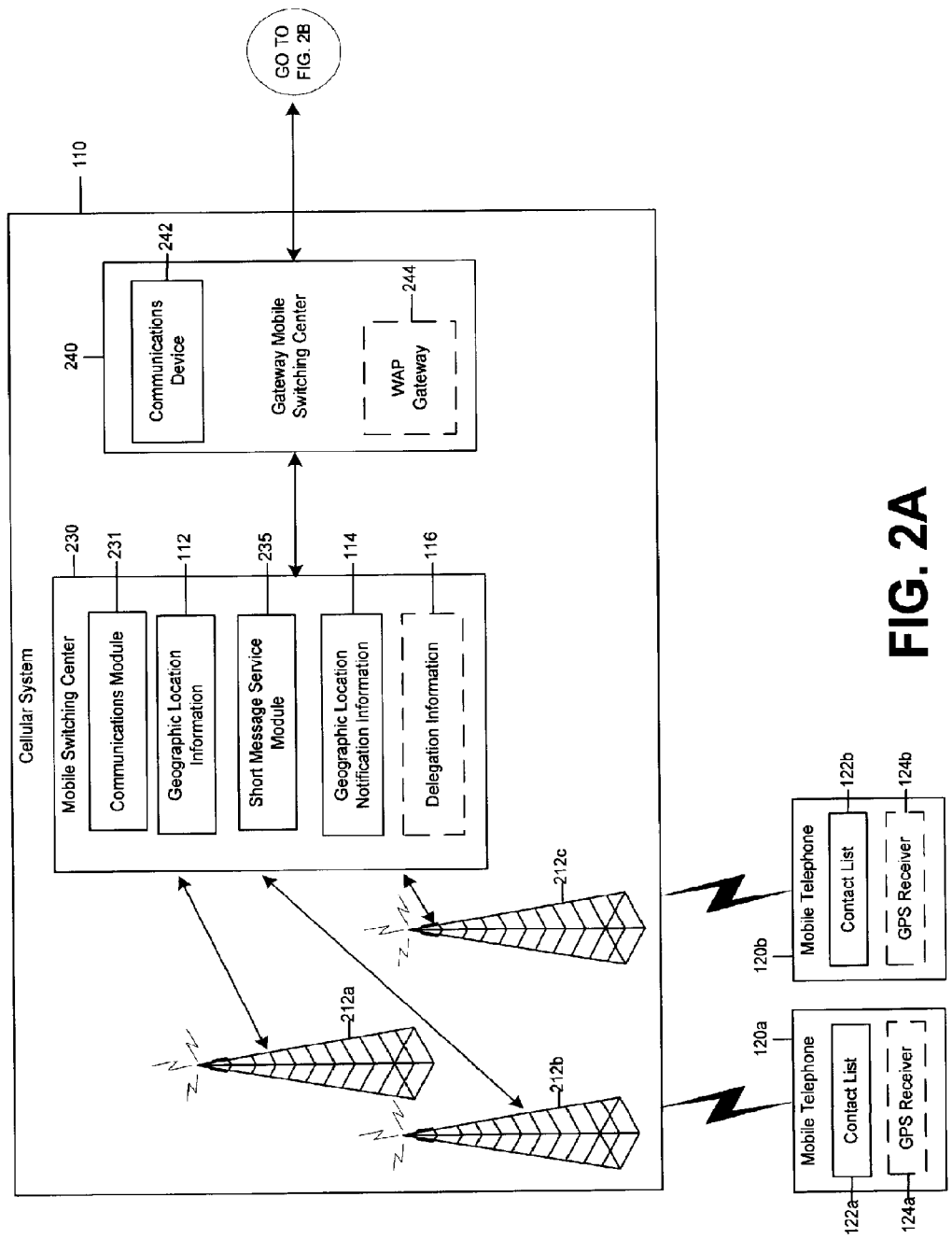
FIGS. 2A and 2B are block diagrams illustrating aspects of the communications system of FIG. 1.
Figure 2B:
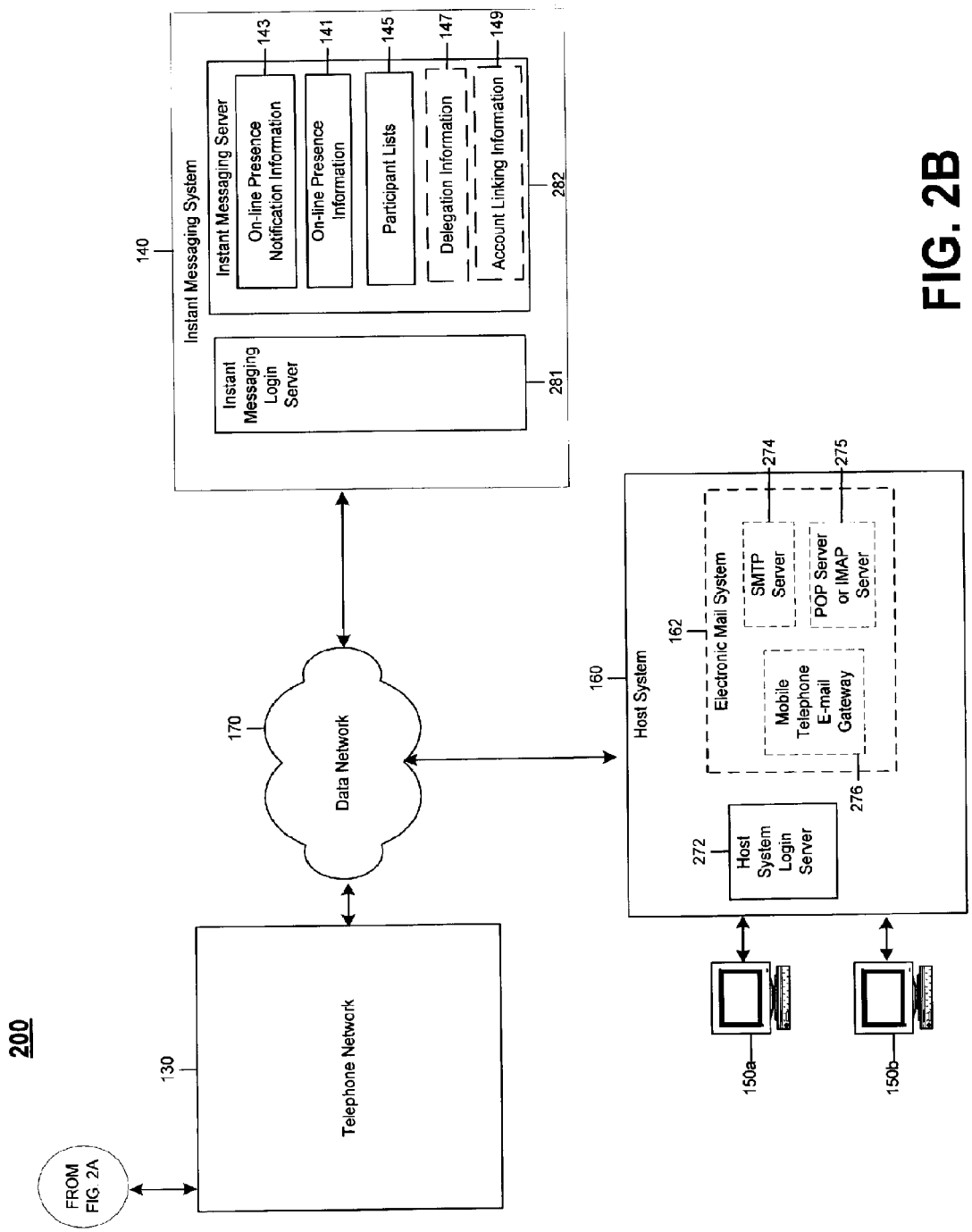

FIGS. 2A and 2B illustrate one particular implementation of a communications system 200 to show the structure generally included with respect to the communications system 100 of FIG. 1. In fact, using the structure and organization shown by FIG. 1, FIGS. 2A and 2B provide an illustration of the systems that may be used to implement each of cellular system 110, telephone network 130, instant messaging system 140, and data network 170. The communications system 200 includes a cellular system 110 that is accessed by one or more mobile telephones 120a and 120b and is capable of detecting or receiving an indication of the geographic location of each of the mobile telephones 120a and 120b. The mobile telephones 120a and 120b communicate with the cellular system 110 in order to make and receive telephone calls.

More particularly, the cellular system 110 includes base stations 212a, 212b and 212c. When either of the mobile telephones 120a or 120b is turned on, the mobile telephone 120a or 120b finds the nearest base station 212a, 212b or 212c and establishes a communications link with that base station. For example, the mobile telephone 120a establishes a communications link with the base station 212b since the base station 212b is closest to the mobile telephone 120a, and the mobile telephone 120b establishes a communications link with the base station 212c since the base station 212c is closest to the mobile telephone 120b. The process of establishing a communications link with a base station 212a, 212b or 212c is called registration. The base stations 212a, 212b and 212c include antennas, amplifiers, receivers, transmitters, and similar hardware for sending signals to and receiving signals from the mobile telephones 120a and 120b. Each base station may send signals to and receive signals from multiple mobile telephones 120a and 120b. When a user of a first mobile telephone 120a places a call to a user of a second mobile telephone 120b, the first mobile telephone 120a communicates with the base station 212b with which registration has occurred. More particularly, when the user speaks into the first mobile telephone 120a, the speech is converted into an analog or digital audio signal that is transferred to the base station 212b.

The base station 212b sends the audio signal to a mobile switching center 230. While only a single mobile switching center 230 is show, the cellular system 110 typically includes more than one mobile switching center 230. The mobile switching center 230 is responsible for sending signals to and receiving signals from multiple base stations 212a, 212b and 212c, but no base station 212a, 212b or 212c communicates with multiple mobile switching centers 230. The mobile switching center 230 is operable to route the audio signal received from the base station 212b that communicates with the first mobile telephone 120a. Each mobile switching center 230 includes a communications module 231 that determines how the audio signal is to be routed and that sends the audio signal to the appropriate destination. The mobile switching center 230 also includes a short message service module 235 that is similar in function to the communications module 231. However, while the communications module 231 determines how audio signals are routed, the short message service module 235 determines how text messages are routed between the mobile telephones 120a and 120b.

When the second mobile telephone 120b communicates with a base station 212c that is serviced by the same mobile switching center 230 as the base station 212b with which the audio first mobile telephone 120a communicates, the mobile switching center 230 simply forwards the audio signal to the base station 212c, and the base station 212c forwards the audio signal to the second mobile telephone 120b so that the user of the second mobile telephone 120b is able to hear what the user of the first mobile telephone 120a said. In contrast, when the second mobile telephone 120b and the first mobile telephone 120a communicate with base stations that are not serviced by the same mobile switching center 230, then the mobile switching center 230 sends the audio signal to a gateway mobile switching center 240 for further routing of the call to the appropriate mobile switching center and, subsequently, to the second mobile telephone 120b.

The cellular system 110 includes one gateway mobile switching center 240. The gateway mobile switching center 240 takes calls from one or more mobile switching centers 230 and routes the calls to the appropriate destination. The gateway mobile switching center 240 includes a communications device 242 that is operable to determine how the calls are to be routed and, based on the determination, to route the calls to the appropriate destination. For example, if the first mobile telephone 120a and the second mobile telephone 120b are serviced by different mobile switching centers, then a call placed from the first mobile telephone 120a to the second mobile telephone 120b is routed through the base station 212b and a mobile switching center 230 near the first mobile telephone 120a, through the gateway mobile switching center 240, through a different mobile switching center 230 and base station 212c near the second mobile telephone 120b, and, finally, to the second mobile telephone 220b itself.

The gateway mobile switching center 240 also includes a wireless application protocol (WAP) gateway 244. WAP is a standard with which wireless devices, can access a data network. As such, the WAP gateway 244 provides a route by which the mobile telephones 120a and 120b can access the data network 170. For example, when a mobile telephone 120a or 120b attempts to access the data network 170, the signal from the mobile telephone 120a or 120b is routed through one of the base stations 212a-212c, the mobile switching center 230, and the WAP gateway 244 of the gateway mobile switching center 240 before traveling through the telephone network 130 to reach the data network 170.

When the call from the first mobile telephone 120a is placed to a grounded telephone (not shown) connected to the telephone network 130 instead of the second mobile telephone 120b, the gateway mobile switching center 240 routes the call to the telephone network 130, and the telephone network 130 routes the call to the grounded telephone. Similarly, when the call from the first cellular system 120a is placed to an external cellular system (not shown) that is different from the cellular system 210 used by the first mobile telephone 120a, the gateway mobile switching center 240 routes the call to the telephone network 130, the telephone network 130 routes the call to the external cellular system, and the external cellular system routes the call to the final destination.

The communications system includes a host system 160 to which computers 150a and 150b may be connected. Users of the computers 150a and 150b have accounts with the host system 160. The users enter information to authenticate the accounts, and the authentication information is verified by a host system login server 272. If the host system login server 272 verifies the authentication information, then the computer 150a and 150b are allowed to access the host system 160.

For example, after logging in to the host system 160, the users may access an electronic mail system 162. The electronic mail system 162 includes a secure mail transfer protocol (SMTP) server 274 that is used to send messages created by the users of the computers 150a and 150b. Messages sent to the users are stored on a server 275 that implements the post office protocol (POP) or the Internet message access protocol (IMAP). After a user logs in to the host system 160 and accesses the electronic mail system 162, the user may request to view messages stored on the POP or IMAP server 275. The messages are transferred from the POP or IMAP server 275 to the computer that the user is using.

The electronic mail system 162 also includes a mobile telephone e-mail gateway 276 with which users of the mobile telephones 120a and 120b may access the electronic mail system 162. By way of example, when a user of the mobile telephone 120a wishes to access the electronic mail system 162, a connection between the mobile telephone 120a and the host system 160 must be established. To do so, the mobile telephone 120a accesses the WAP gateway 244 of the gateway mobile switching center 240, and the WAP gateway 244 provides a connection to the data network 170 to which the host system 160 is connected. The user of the mobile telephone 120a logs in to the host system 160 with the host system login server 272. After logging in, the user of the mobile telephone 120a may access the SMTP server 274 and the POP or IMAP server 275 to send and receive electronic mail through the mobile telephone e-mail gateway 276.

After logging in to the host system 160, users of the computers 150a and 150b may access an instant messaging system 140. Similarly, users of the mobile telephones 120a and 120b may access the instant messaging system 144 through the WAP gateway 244. The instant messaging system 140 is used to send text-based messages between the users. Each user has an account with the instant messaging system that is authenticated before any instant messages are sent or received by the user. The user uses a computer 150a or 150b or a mobile telephone 120a or 120b to enter information to authenticate the account, and the information is sent to an instant messaging login server 281 included in the instant messaging system 140. The instant messaging login server 281 verifies that the authentication information is correct and enables the user to access an instant messaging server 282. The instant messaging server 282 facilitates the transfer of messages between users.

The geographic locations of the mobile telephones 120a and 120b may be inferred from the connection of the mobile telephones 120a and 120b to the cellular system 110. In one implementation, signals from the mobile telephones 120a and 120b may be received by multiple base stations 212a-212c. The distance between a mobile telephone 120a or 120b and the base stations 212a-212c may be determined from the time needed for a signal to travel from the mobile telephone 120a or 120b to the base stations 212a-212c, since distance is proportional to the time needed for the signal to travel from the mobile telephone 120a or 120b to the base station 212a, 212b, or 212c. Since the geographic locations of the base stations 212a-212c are known, the geographic location of the mobile telephone 120a or 120b can be determined based on the distance of the mobile telephone 120a or 120b from the base stations 212a-212c.

More particularly, the mobile telephone is located somewhere on a circle centered at the base station with a radius equal to the distance between the mobile telephone and the base station. When the distance of the mobile telephone from multiple base stations is known, triangulation may be used to more accurately determine the geographic location of the mobile telephone. More particularly, the intersection of the sets of possible locations of the mobile telephone relative to the multiple base stations (i.e., the circles of possible locations of the mobile telephones around the base stations) defines the possible geographic locations of the mobile telephone. When distances from two base stations are known, triangulation results in two possible geographic locations for the mobile telephone. When distances from more than two base stations are known, triangulation results in a single possible determination of the geographic location.

In another implementation, a less precise geographic location of the mobile telephone 120a or 120b is determined by identifying the base station with which the mobile telephone is communicating. Based on this identification, the location of the mobile telephone is designated as being "near" the geographic location of the base station.

In yet another implementation, the mobile telephones 120a and 120b may use the included GPS receivers 124a and 124b, respectively, to determine the location of the mobile telephones 120a and 120b. The mobile telephones 120a and 120b transfer the geographic location identified with the GPS receivers 124a and 124b to the cellular system 110 for use.

In yet another implementation, the location of the mobile telephones 120a and 120b may be indicated by users of the mobile telephones 120a and 120b. For example, the users may specify the geographic locations of the mobile telephones 120a and 120b, and the geographic locations may be transferred to and stored in the geographic location information 112.

Figure 3:
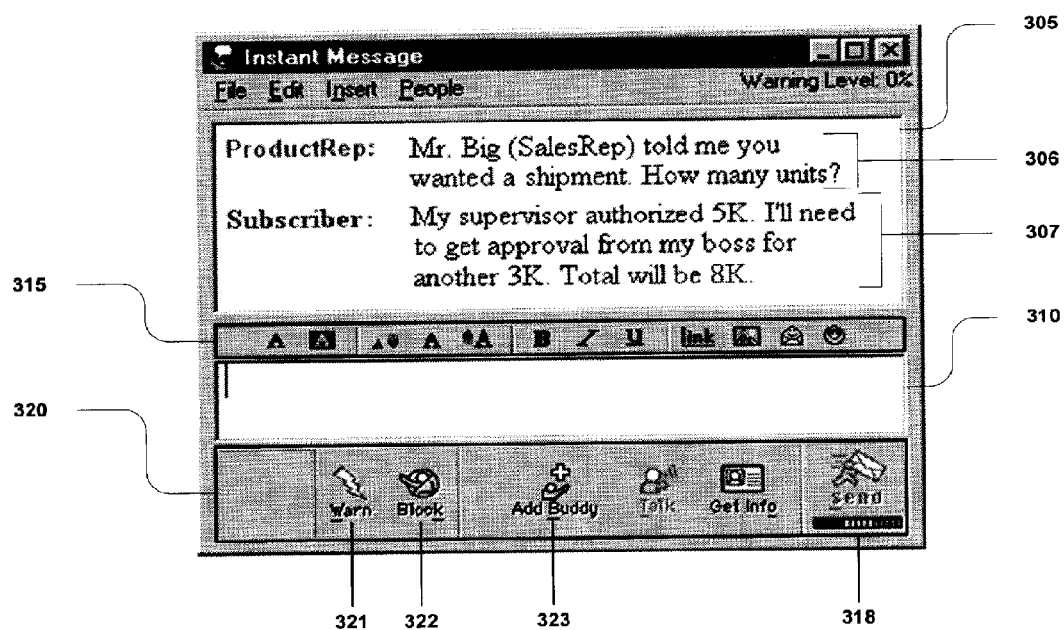
FIG. 3 is a diagram of a user interface for sending and receiving instant messages using an instant messaging service capable of controlling dissemination of notification information.

FIG. 3 illustrates an instant messaging interface 300 with which instant messages may be sent and received. In response to use of the instant messaging interface 300, notification information may be disseminated in a manner that is controllable by a user of the instant messaging interface 300. After a sender of instant messages is notified that a recipient is "present" and available to send and receive instant messages, the sender may use the instant messaging interface 300 to exchange instant messages with the recipient. The instant messaging interface 300 includes a message history box 305 that lists the instant messages sent between the sender and the recipient. The message history box 305 also may be referred to as a message transcript box 305. Each message is presented with an indication of a screen name by which the sender or the recipient is identified as the source of the message. Each message listed in the message history box 305 also includes the text of the instant message sent by the sender or the recipient. For example, the message history box 305 includes a message 306 sent by a user with a screen name "ProductRep" and a message 307 sent by a user with a screen name "Subscriber." The users that sent the messages 306 and 307 are, respectively, the sender and the recipient. In one implementation, each message listed in the message history box 305 includes a time stamp of when the message was sent.

The instant messaging interface also includes a message specification box 310 in which the sender may specify a message to be sent to the recipient. The sender may enter text to be sent to the recipient in the message specification box 310. The instant message interface 300 includes a set of format controls 315 that may be used to format the text entered in the message specification box 310. More particularly, the controls in the format controls 315 enable the user to change the size, foreground color, background color, style, and effects of the text entered in the message specification box 310. The format controls 315 also include controls for inserting objects that are not plain text, such as hyperlinks and emoticons, into the message specification box 310.

After a message has been specified in the message specification box 310, it may be sent by selecting a send button 318 included in a second set of controls 320. After the send button 318 has been selected, the text that has been entered in the message specification box 310 is sent to the recipient, the message specification box 310 is cleared, and the message is added to the message history box 305. The message also is displayed in a message history box 305 of an instance of the instant messaging interface 300 being viewed by the recipient. Also included in the second control set 320 are controls for warning (321) or blocking (322) instant messages or adding (323) the recipient to a participant list maintained by the sender.

FIGS. 4A and 4B are illustrations of participant list interfaces 400A and 400B for an instant messaging system that indicate whether the members of a participant list are to receive notifications of geographic location or on-line presence of a user of the participant list interfaces 400A and 400B. Each of the participant list interfaces 400A and 400B includes a participant list 405. The people included in the participant list 405 may be separated into one or more groups, and a determination of whether the members of the participant list 405 are sent notifications of geographic location or on-line presence may be specified on a group-by-group basis. For example, the participant list 405 in the participant list interface 400A includes a group named "Recent Contacts," and the members of the "Recent Contacts" group receive notifications of geographic location, as evidenced by the geographic location icon 410 next to the heading of the "Recent Contacts" group. Similarly, the participant list 405 in the participant list interface 400A includes a group named "Family," and the members of the "Family" group are not to be provided with notifications of geographic location of the user, as evidenced by the negative geographic location icon 415 next to the heading of the "Family" group.

Whether the members of the participant list 405 are provided with notifications of the user's geographic location or on-line presence also may be specified on a member-by-member basis. For example, the participant list 405 in the participant list interface 400B includes a screen name "Boss." The member corresponding to the screen name "Boss" is sent notifications of on-line presence of the user, as evidenced by an on-line presence icon 420 next to the screen name "Boss." Similarly, the participant list 405 in the participant list interface 400B includes a screen name "SalesRep." The member corresponding to the screen name "SalesRep" is not sent notifications of on-line presence of the user, as evidenced by negative on-line presence icon 425 next to the screen name "SalesRep."

Entire groups in the participant list 405 also may be provided or explicitly not provided with notifications of on-line presence, and this may be evidenced through the display of an on-line presence icon or a negative on-line presence icon next to one of the group headings in the participant list 405. Similarly, individual members of the participant list 405 also may optionally be provided with notifications of geographic location, and this may be evidenced through the display of a geographic location icon or a negative geographic location icon next to an individual screen name in the participant list 405.

In addition, individual members of a group may be opted out of the status assigned to the group. For example, in FIG. 4A, a negative geographic location icon could be used to indicate that "Sales Rep" is not to receive geographic location information even though the "Recent Contacts" group to which "Sales Rep" belongs is authorized to receive such information.

Notifications of geographic location or on-line presence may be sent to locations external to the instant messaging system for which the participant list interfaces 400A and 400B are displayed. For example, notifications of geographic location may be sent from the instant messaging system to a cellular telephone system. When notifications are sent to an external system, an external system icon 430 is placed next to one of the icons 410 or 420 displayed with the group or screen name to which the notifications are sent. For example, the notifications of geographic location that are sent to the members of the "Recent Contacts" group of the participant list 405 of the participant list interface 400A are sent to an external communications system. This is evidenced by the external system icon 430 that is displayed next to the geographic location icon 410.

The user may define time periods and may designate the people to whom notifications are sent based on a current time period. The nature and means of specifying the time period is described below with respect to FIGS. 5 and 6. The participant list interfaces 400A and 400B include an indicator 435 that indicates the time period that is currently occupied. For example, the indicator 435 indicates that a time period that the user has named "Personal Time" is currently occupied. Notifications are sent according to the definition of the "Personal Time" time period. The user may choose to override the notification settings defined for the "Personal Time" time period through selection of an override button 440. Selecting the override button 440 causes notifications to be withheld because the definition of the "Personal Time" time period calls for notifications to be sent to certain members of the participant list 405.

FIGS. 4C and 4D illustrate participant list setup interfaces 400C and 400D with which the people to whom notifications of geographic location or on-line presence are sent may be specified. Each of the participant list setup interfaces 400C and 400D includes a participant list 455 that includes screen names of people with whom instant messages are exchanged using an instant messaging system. Names may be added to and removed from the participant list 455 using the participant list setup interfaces 400C or 400D. Names may be separated into groups and groups may be created or removed with the participant list interfaces 400C or 400D.

Groups or individual users may be selected to receive notifications of on-line presence or geographic location, and the display of icons 460, 465, 470, and 475 next to the names of the groups or the individual users indicate if and what kind of notifications are to be received. An external system icon 480 indicates whether notifications for the corresponding group or individual user are sent to an external system. For example, notifications may be sent from the instant messaging system for which the participant list setup interfaces 400C and 400D are displayed to a cellular telephone system when the notification settings specify that a user of the cellular telephone system may be sent notification information. The icons 460-480 have a similar meaning and interpretation as the icons 410-430 of FIGS. 4A and 4B.

Figure 5:
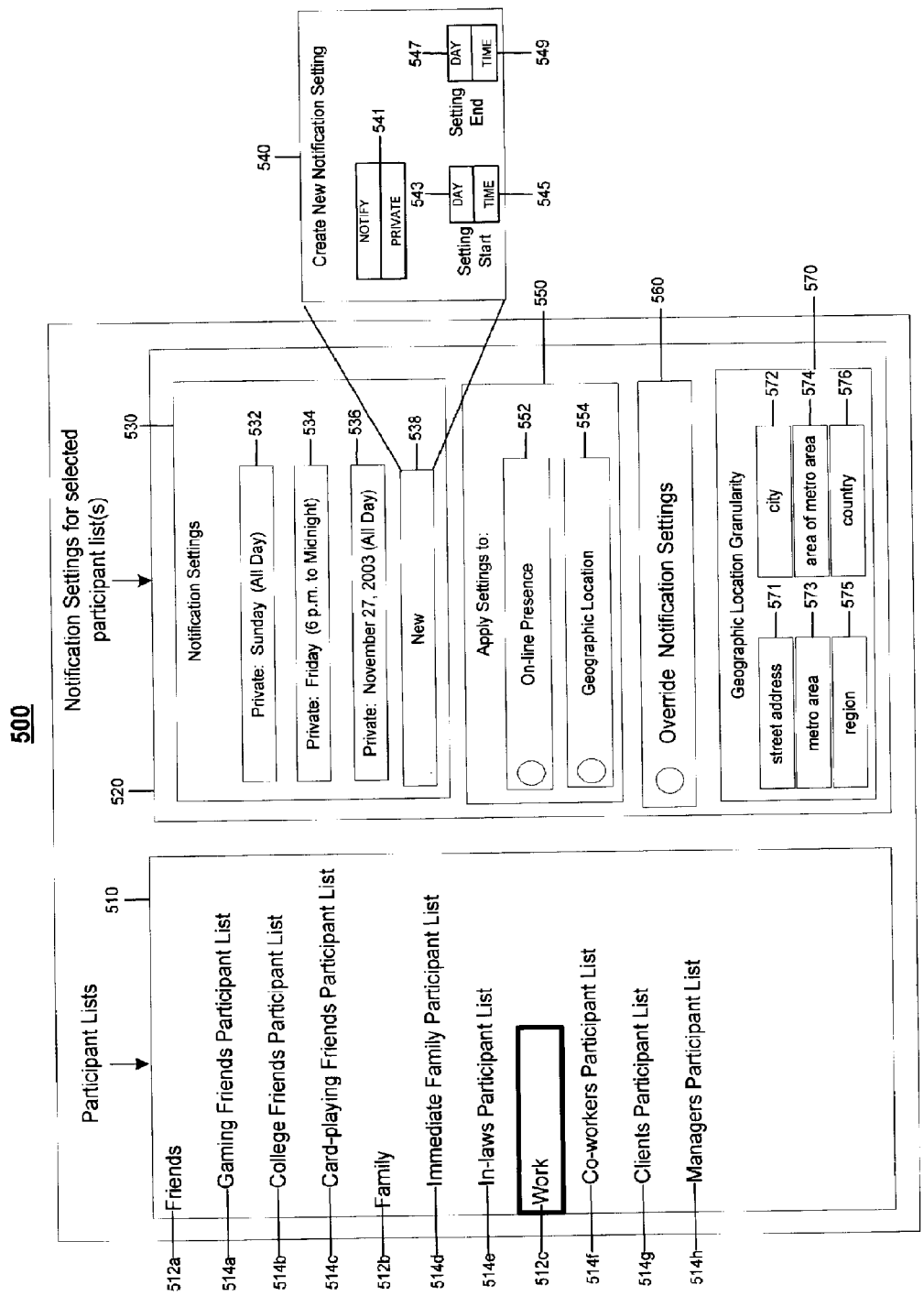
FIGS. 5, 6A and 6B are diagrams depicting user interfaces for identifying temporal periods during which notifications of geographic location and on-line presence are to be permitted or restricted.

The participant list setup interfaces 400C and 400D include a setup button 485 that may be selected to enable the specification of notification settings for the people included in the participant list 455. In one implementation, selecting the setup button 485 displays an interface for specifying notification settings FIG. 5 illustrates a user interface 500 with which settings related to notifications of on-line presence and geographic location may be specified. The notification settings interface 500 enables the specification of dates and times during which notifications of on-line presence and geographic location of a user may be sent to particular people or groups of people with whom communication occurs. The notification settings interface 500 also enables the specification of dates and times during which notifications are not sent to particular people or groups of people with whom the user communicates. The user interface 500 may be implemented on the instant messaging system 140, the computer 150a or 150b, or the host system 160 of FIG. 1. A user of the computer 150a or 150b may access the user interface 500 from the instant messaging system 140 or the host system 160 if the user interface 500 is not implemented on the computers 150. The notification settings specified through use of the user interface 500 are stored in the geographic location notification information 114 or on-line presence notification information 143 of FIG. 1.

Typically, the user using the user interface 500 to enter or raise notification settings is the same user to whom the notification settings apply. However, this is not necessarily so. In some implementations, a user may delegate authorization to another user to modify notification settings on the user's behalf. For example, a user that is a child may delegate authorization to a parent to modify notification settings on the child's behalf, and the parent may use the user interface 500 to do so. As another example, users under the jurisdiction of a government may delegate authority to the government to modify notification settings on behalf of the users. As yet another example, an employee may delegate authorization to modify notification settings to art employer. Typically, authorization to modify notification settings is delegated to a user of a higher status. However, the authorization may be delegated to a user of a lower status. For example, a parent may delegate the authorization to a child, a government may delegate the authorization to users under the jurisdiction of the government, or an employer may delegate the authorization to an employee, The notification settings interface 500 includes a participant list window 510 of participant lists maintained by the user. Each participant list includes names of people with whom communication regularly occurs. The communication may be in the form of instant messages and/or mobile telephone calls. The participant list window 510 may be separated into groups, and similar participant lists may be placed in the same group. For example, the participant list window 510 includes three groups 512a-512c. The group 512a is for participant lists that include friends, such as a gaming friends participant list 514a, a college friends participant list 514b, and a card-playing friends participant list 514c. Similarly, a family group 512b is for of participant lists that include family members, such as an immediate family participant list 514d and an in-laws participant list 514e. Finally a work group 512c includes a co-workers participant list 514f, a clients participant list 514g, and a managers participant list 514h.

Each of the participant lists 514a-514h may be a buddy list from an instant messaging system, a contact list of a cellular telephone system, or another list including contact information. In one implementation, the participant lists 514a-514h may be of mixed types. For example, the participant list 514a may be a buddy list from an instant messaging system while the participant list 514b may be a contact list from a cellular telephone system. In another implementation, one of the participant lists 514a-514h may include contact information of multiple types. For example, the participant list 514c may include instant messaging screen names and mobile telephone numbers.

The groups 512a-512c and the participant lists 514a-514h may be expanded and collapsed to display the contents of the groups 512a-512c and the participant lists 514a-514h. Expanding one of the groups 512a-512c makes visible the names of the participant lists that are included in the group, while collapsing one of the groups 512a-512c hides the names of the participant lists that are included in the collapsed group. Similarly, expanding one of the participant lists 514a-514h makes visible the communications identities included in the expanded list, while collapsing one of the participant lists 514a-514h hides communications identities included in the collapsed list. Simultaneously expanding and collapsing the groups 512a-512c and the participant lists 514a-514h makes visible the hierarchy of communications identifiers. For example, the groups 512a-512c occupy the top level of the hierarchy, the participant lists 514a-514h occupy the next lower level, groups within the participant lists 514a-514h occupy the next level, and the individual communications identifiers within the participant groups occupy the bottom level. Notifications settings may be created for each element in the hierarchy. Notification settings specified for a particular element in the hierarchy apply to all communications identifiers below the element in the hierarchy, unless settings for underlying elements are affirmatively changed. In another implementation, the set of communications identifiers included in the participant lists 514a-514h may be modeled as a single list without a hierarchical structure.

The notification settings interface 500 also includes a notification settings window 520 that displays notification information for an item selected from the participant list window 510. The item selected from the participant list window 510 may be a group of participant lists, such one of the groups 512a-512c. The item may be an individual participant list from within a group of participant lists, such as one of the participant lists 514a-514h. The item may be a group of communications identities from within a participant list, or the item may be an individual communications identity. The item also may be a combination of groups, participant lists, groups from a participant list, or communications identities. The item may be selected through use of a pointing device or by typing the name of the item to be selected.

Here, the work group 512c has been selected from the participant list window 510, and information from the notification settings window 520 applies to all communications identities identified in the participant lists 514f-514h. The notification settings window 520 includes a settings list 530 with multiple settings 532-538 that specify different dates and times during which notifications are or are not sent to all communications identities identified in the participant lists 514f-514h. For example, the setting 532 specifies that no notifications are to be sent all day on Sunday, because the setting 532 is listed as private. Similarly, the setting 534 indicates that no notifications are to be sent from 6 P.M. to midnight on Friday, and the setting 536 indicates that no notifications are to be sent all day on Friday, Nov. 27, 2003. The setting 538 currently does not specify a temporal period during which notification information is to be sent or withheld.

More particularly, each of the settings was created through use of a create setting window 540. All of the settings 532-538 are initially unspecified. Selection of one of the settings 532-538 displays a create setting window 540. The create setting window 540 includes a setting type option 541. Setting the setting type option 541 to "notify" indicates that notifications are to be sent during the date and time specified with the notification setting tool 540. On the other hand, setting the setting type option 541 to "private" indicates that notifications are not to be sent during the date and time specified with the notification setting tool 540. When the create setting window 540 was displayed for the settings 532, 534, and 536, the setting type option 541 was set to "private." In one implementation, the setting type option has a default value of "notify." In another implementation, the setting type option has a default value of "private."

A starting date and time of the period during which the setting being specified with the create setting window 540 is to be applied may be specified. A date on which the time period begins may be specified in a start date field 543. In one implementation, the start date field 543 is used to specify a particular month, day, and year on which the time period is to begin. For example, when the create setting window 540 was displayed for the setting 536, the date "Nov. 27, 2003" was specified in the start date field 543. In another implementation, the start date field 543 is used to specify days of the week on which the time period is to begin. For example, when the create setting window 540 was displayed for the settings 532 and 534, the days "Sunday" and "Friday," respectively, were specified. When a day of the week is specified in the start date field 543, then the corresponding setting applies each week, beginning on the day specified in the start date field 543. In another implementation, more complicated repetitions, such as once a month, may be specified with the start date field 543.

A starting time of the period during which the setting being specified with the create setting window 540 is to be applied may be specified with a start time field 545. The start time field 545 may be used to specify an hour and minute at which the setting is to take effect. For example, when the create setting window 540 was displayed for the setting 534, the time 6:00 P.M. was specified in the start time field 545. More abstract times, such as "morning," "evening," or "all day" may be specified in the start time field. For example, the setting "all day" was selected from the start time field when the create setting window 540 is displayed for the settings 532 and 536.

An ending date and time of the period during which the setting being specified with the create setting window 540 is to be applied may be specified in an end date field 547 and an end time field 549, respectively. The end date field 547 is similar to the start date field 543 in the information that it may be used to specify-. The information may be a specific month, day, and year on which the time period during which the corresponding setting applies is to end. For example, when the create setting window 540 was displayed for the setting 536, the date "Nov. 27, 2003" was specified in the end date field 547. In one implementation, the value of the end date field 547 is set to the value specified in the start date field 543 once a value has been specified in the start date field 543. In another implementation, the end date field 547 is used to specify a day of the week on which the time period is to end. For example, when the create setting window 540 was displayed for the settings 532 and 534, the days Sunday and Friday, respectively, were specified. When a day of the week is specified in the end date field 547, then the corresponding setting applies each week, ending on the day specified in the end date field 547. In another implementation, more complicated repetitions, such as once a month, may be specified with the start date field 547.

An ending time of the period during which the setting being specified with the create setting window 540 is to be applied may be specified with an end time field 549. The end time field 549 may be used to specify an hour and minute at which the setting is to stop taking effect. For example, when the create setting window 540 was displayed for the setting 534, the time "12:00 A.M." was specified in the end time field 549. When an abstract time, such as "morning," "evening," or "all day" has been specified in the start time field 545, then the end time field 549 may be set to the same abstract time.

The user interface 500 includes a scope window 550, and the options within the scope window 550 determine the type of notifications to be sent or withheld from the communications identities corresponding to the item selected from the participant list window 510. Options 552 and 554 determine whether the settings 532-538 in the settings list 530 are applied to geographic location notifications and/or on-line presence notifications. More particularly, selecting a geographic location option 552 causes the entries 532-538 in the settings list to be applied to geographic location notifications. Similarly, selecting an on-line presence option 554 causes the entries 532-538 in the settings list to be applied to on-line presence notifications. The setting of one of the options 552 or 554 does not affect the setting of the other option 552 or 554, though both options may be set.

The notification settings interface 500 includes an override option 560 that may be selected to allow the current notification settings to override any other notification settings that have been specified for the communications identities corresponding to the item selected in the participant list window 510. For example, a user may wish to always provide notification information to a spouse, so the user may select the override option 560 and specify a setting in the setting list 530 that dictates that the spouse is always provided with notification information. In this case, the setting to always provide the spouse with notification information overrides any other settings that control how notification information is disseminated to the spouse. As another example, a user may specify that no notification settings are to be sent during the weekend, but a client may wish to be provided with notification information during a particular weekend. In such a case, the user may create a notification setting that dictates that the client is to be sent notification information over the particular weekend and that overrides any other settings for the client. In one implementation, the system is configured to detect notification overrides that conflict with one another, and to permit the user to resolve the conflict.

In some implementations, the granularity of the geographic location disseminated may be controlled with the user interface 500. In such implementations, the user interface 500 includes a geographic location granularity window 570. Included in the geographic granularity window 570 is a series of mutually exclusive options 571-576. Each of the options 571-576 corresponds to a certain level of granularity in the geographic location information that may be transmitted as a result of the notification settings in the notification settings list 530. The most detailed geographic location information is provided when the street address option 571 is selected. Selecting the city option 572 provides geographic location information to the level of the city currently occupied, but the location within the city is not provided. Selecting the metropolitan area option 573 provides geographic location information to the level of the metropolitan area currently occupied, but the location within the metropolitan area is not provided. Selecting the area of a metropolitan area option 574 provides geographic location information to the level of the area within a metropolitan area currently occupied, but the location within the area of the metropolitan area is not provided. Selecting the region 575 provides geographic location information to the level of the region of a country currently occupied (e.g., the state), but the location within the region is not provided. Selecting the country 575 provides geographic location information to the level of the country currently occupied, but the location within the country is not provided.

The user interface 500 enables the easy entry and specification of notification settings. A user of the user interface 500 may quickly select and specify notification settings to be applied to many communications identities. This minimizes the burden of entering and revising notification settings.

Figure 6A:
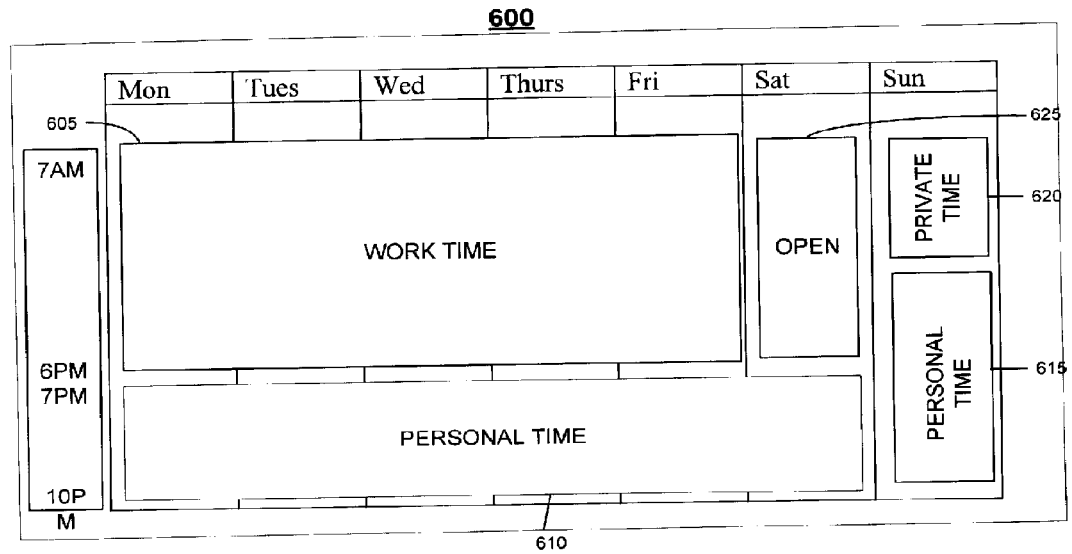

FIG. 6A illustrates a calendar interface 600 that may be used to specify dates and times during which notifications of on-line presence and geographic location are and are not to be sent. The calendar interface 600 displays one week, and a user of the calendar interface 600 may create and select time slots 605-625 in which to specify how notifications are sent. The time slots 605-625 may be created to group periods of time during which notification settings are the same, thereby minimizing the amount of configuration performed by the user.

For example, the calendar interface 600 includes a work time slot 605 that covers the hours from 7 A.M. to 6 P.M. on Monday through Friday. The calendar interface 600 includes a first personal time slot 610 that covers the hours from 7 P.M. to 10 P.M. from Monday through Saturday. A second personal time slot 615 covers the time between approximately 2 P.M. to 10 P.M. on Sunday. A private time slot 620 covers the time between 7 A.M. and approximately 1 P.M. on Sunday. Finally, the calendar interface 600 includes an open time slot 625 between 7 A.M. and 6 P.M. on Saturday.

Figure 6B:
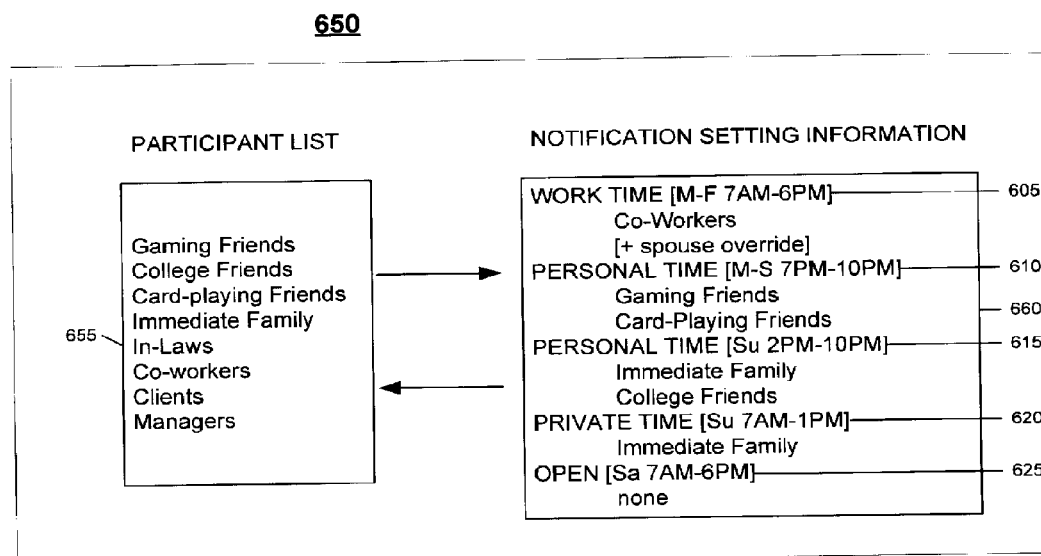

In order to specify how notifications are to be sent, participant lists may be associated with the time slots 605-625. Referring also to FIG. 6B, an association 650 relates participant lists to the time slots 605-625. The association 650 includes a list 655 of participant lists and a list 660 of time slots. Each of the time slots 605-625 that is included in the list 660 corresponds to one of the time slots 605-625 of FIG. 6A and is associated with a set of notification settings. Notification settings of each of the time slots 605-625 apply to the participant lists associated with the time slot. For example, since the participant list named "Co-Workers" is associated with the work time slot 605, the notification settings corresponding to the work time slot 605 are applied to the communications identities included in the "Co-workers" participant list. As another example, since the participant lists named "Gaming Friends" and "Card-playing Friends" are associated with the first personal time slot 610, the notification settings corresponding to the first personal time slot 610 are applied to the communications identities included in the "Gaming Friends" and "Card-playing Friends" participant lists. In addition to having full participant lists associated with the time slots 605-625, individual communications identities may be specified to obey or override the notification settings corresponding to the time slots 605-625. For example, a communications identity named "spouse" has been associated with and selected to override the notification settings corresponding to the work time slot 605.

In another implementation, names of participant lists may be dragged with a mouse from a list of participant lists that is similar to the participant list window 510 from FIG. 5 to one of the time slots 605-625 to create an association between the participant lists and the time slots 605-625. Dragging and dropping the name of a participant list over a time slot may indicate that the people included in the participant list are (or are not) to be sent notifications of on-line presence or geographic location during the period of time corresponding to the time slot. A secondary action, such as pressing and holding a key on a keyboard, may be used in addition to the dragging and dropping of participant list names with the mouse to specify whether the people included in the participant lists being dragged and dropped are or are not to be sent notifications. In another implementation, selecting one of the time slots 605-625 may display a tool for specifying the participant lists that are and are not to be sent notifications during the selected time slot.

Figure 7:
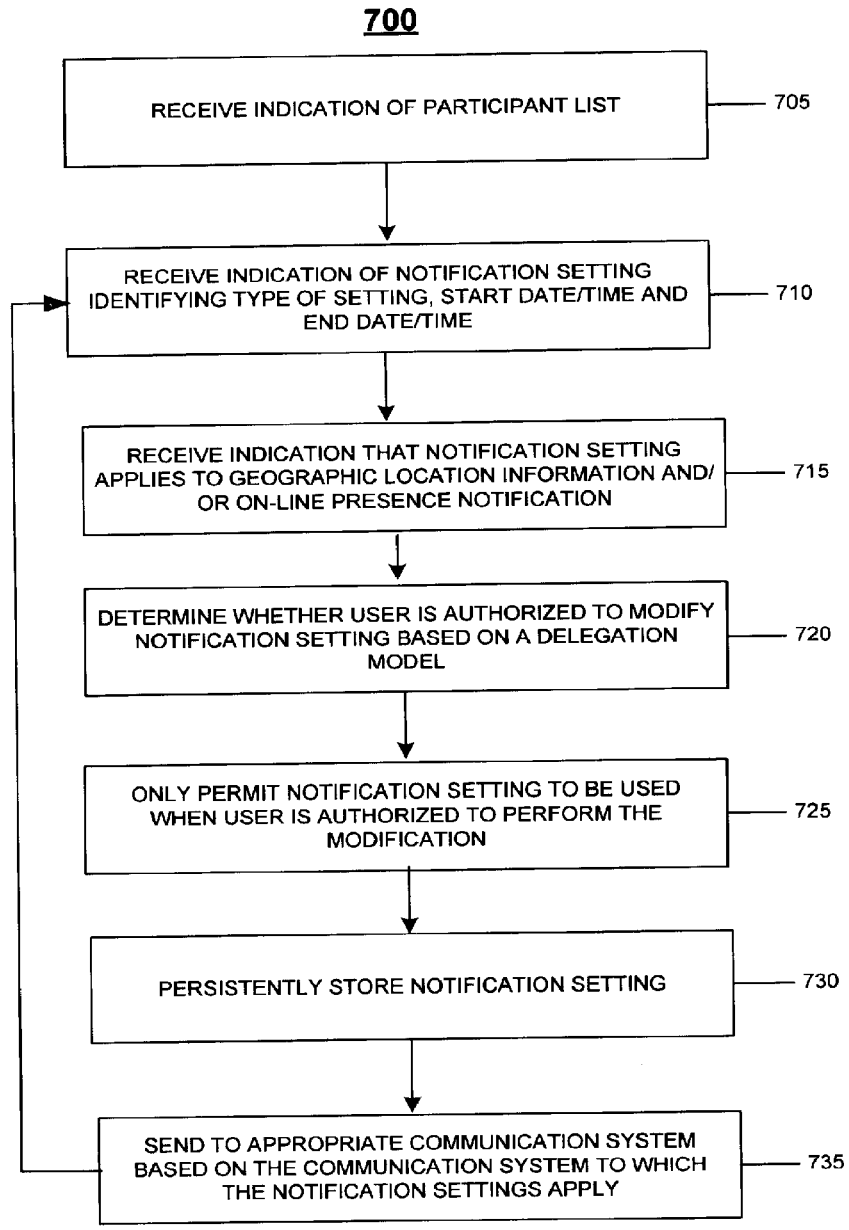
FIG. 7 is a flow chart of a process for indicating how notification information of geographic location or on-line presence is to be disseminated.

FIG. 7 is a flow chart of a process 700 for indicating how notification information of geographic location and/or on-line presence is to be disseminated. The process 700, for example, may be executed by a process of a computer displaying the notification settings interface 500 from FIG. 5 or the calendar interface 600 from FIG. 6 for specifying how notifications of geographic location or on-line presence are to be shared.

The process 700 begins with the receipt of an indication of a participant list (step 705). The participant list includes the names of people with whom instant messages are exchanged. The list may be divided into one or more groups, with each group including one or more names. The people included in the participant list are the people to whom the notification settings created as a result of the execution of the process 700 apply.

The processor then receives an indication of a notification setting that identifies a type of setting, a start date and time, and an end date and time (step 710). By way of example, the processor may receive the indication of a notification setting from the user interfaces 500 or 600.

The notification setting has one of two types: notify and private. The notification setting also specifies a period of time. When the notification setting type is notify, notification information is provided during the period of time. When the notification type is private, notification is withheld during the period of time. In one implementation, the notification setting has a default type of private, so private notification settings do not need to be specified explicitly. In another implementation, the notification setting has a default type of notify, so notification settings of that type do not need to be specified explicitly.

An indication that the notification setting is to apply to geographic location information and/or on-line presence information is received (step 715). The indication also may be received from the user interface 500 or 600.

When delegation information is accessible to the processor, the processor makes a determination as to whether a user of the interface 500 or 600 is authorized to create or modify a notification setting for the chosen person based on a delegation model (step 720). For example, the processor may access the delegation information 116 or 147 of FIG. 1 to determine whether the user of the interface 500 or 600 is authorized to create or modify the notification setting. The delegation model separates the communications identities included in the participant list into multiple categories and indicates how the user may create or modify notification settings for each category. For example, the delegation model may create a hierarchy from the people included in the participant list, and the user may belong to one of the levels of the hierarchy. The user may be prevented from modifying the notification settings corresponding to higher levels in the hierarchy. The user also may be allowed to freely create and modify notification settings corresponding to an equal or lower level of the hierarchy. The user is only allowed to create or modify the notification setting as indicated when permitted by the delegation model (step 725).

If allowed by the delegation model, the notification setting is persistently stored (step 730). The notification setting also is sent to an appropriate communications system based on the communications system to which the notification setting is to apply (step 735). For example, if the notification setting is to apply to geographic location notifications, then the notification setting is sent to a cellular telephone system. Similarly, if the notification system is to apply to on-line presence notifications, then the notification is sent to an instant messaging system.

The process 700 also may be used to specify notification settings that are to apply to parts of the received participant list. For example, notification settings may be specified for individual communications identities within the participant list or for groups of communications identities within the participant list. In such an implementation, the processor receives an indication of the parts of the participant list to which the notification settings are to apply in addition to the indication of the participant list itself. Furthermore, the process 700 also may be used to specify notification settings for communications identities not part of the received participant list. In such an implementation, the processor receives an indication of the communications identities instead of an indication of the participant list.

Figure 8:
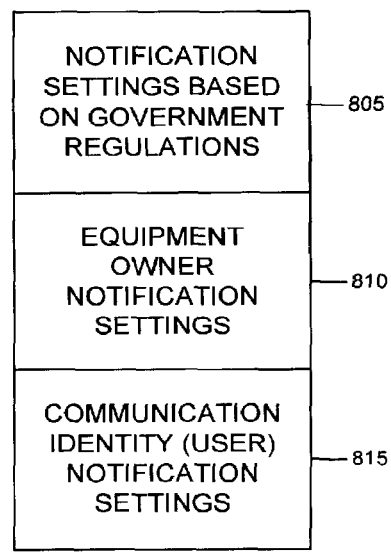
FIG. 8 is a block diagram depicting a delegation model that controls how notification setting information may be specified or modified.

FIG. 8 is an illustration of a delegation model 800 that aids in the determination of how notification setting information corresponding to a user may be specified or modified. The delegation model 800 separates notification settings and users into three categories 805-815, and members of each category are allowed to modify the notification setting information in a particular way. The three categories 805-815 of the delegation model 800 collectively form a hierarchy. Members of the top category 805 of the hierarchy are given the most freedom to modify the notification setting information, while members of the bottom category 815 are given the least freedom to modify the notification setting information. More particularly, a member of a given category of the delegation model 800 is allowed to modify notification settings corresponding to the categories of the hierarchy equal to or lower than the category of the member.

Notification settings corresponding to the top category 805 of the delegation model are based on government regulations. For example, a notification setting from the top category 805 may enable the full-time disclosure of geographic location to essential services and applications, such as emergency services. A typical user is not allowed to create or change a setting that is not in conformance with government regulations because the typical user does not correspond to the top category 805 of the delegation model 800. In one implementation, the typical user may be prevented from making changes to the notification settings corresponding to the top category 805 by preventing access to the notification settings from the top category 805. In another implementation, the notification settings from the top category 805 may override any other settings that are created by the user.

Members of the middle category 810 may create notification settings for equipment owners. Equipment owners are people that provide access to a mobile communications device or an instant messaging system to users. Examples of equipment owners are employers and parents, and examples of users are employees and children. Members of the middle category 810 may modify any notification settings that do not pertain to government regulations. For example, members of the middle category 810 may modify settings that define the terms of a usage agreement held between the equipment owner and the user.

Members of the bottom category 815 may modify any other notification settings that do not fall within the jurisdiction of the other two categories 805 and 810. The user himself may be a member of the bottom category 815 and may modify any notification settings that do not correspond to a superordinate category of the delegation model 800.

As an example, the notification settings for a mobile communications device used by an employee and owned by an employer may include a notification setting corresponding to the middle category 810 that dictates that the geographic location of the device must be made available during business hours or at any time. The notification setting corresponds to the middle category 810 because it defines a usage agreement between the employee and the employer. The employee, a member of the bottom category 805, is not allowed by the delegation model to modify the notification setting corresponding to the middle level 810. Therefore, the geographic location of the mobile communications device is provided as specified by the notification settings corresponding to the middle category 810. However, the employee may specify other notification settings that pertain to, for example, whether the geographic location is provided to the user's family, which correspond to the bottom category 815.

As another example, the notifications for a mobile communications device used by a child and owned by a parent may include a notification setting corresponding to the middle category 810 and specifying that the geographic location of the device is to be made available at all times so that the parent may always know the geographic location of the child. The notification setting corresponds to the middle category 810 because it defines a usage agreement between the child and parent. The child, a member of the bottom category 805, is not allowed by the delegation model to modify the notification setting corresponding to the middle category 810. Therefore, the geographic location of the mobile communications device is provided as specified by the notification settings corresponding to the middle category 810. However, the child may specify other notification settings that pertain to, for example, the child's friends, which correspond to the bottom category 815.

Alternatively or additionally, a delegation model may separate notification settings and users into categories based on characteristics of users. For example, the delegation model may include a category for users who satisfy a condition and a category for users who do not satisfy the condition. For example, the condition may differentiate between employees of a company and other users. The two categories specified by the condition may be used to specify how notification setting information may be changed.

Figure 9:
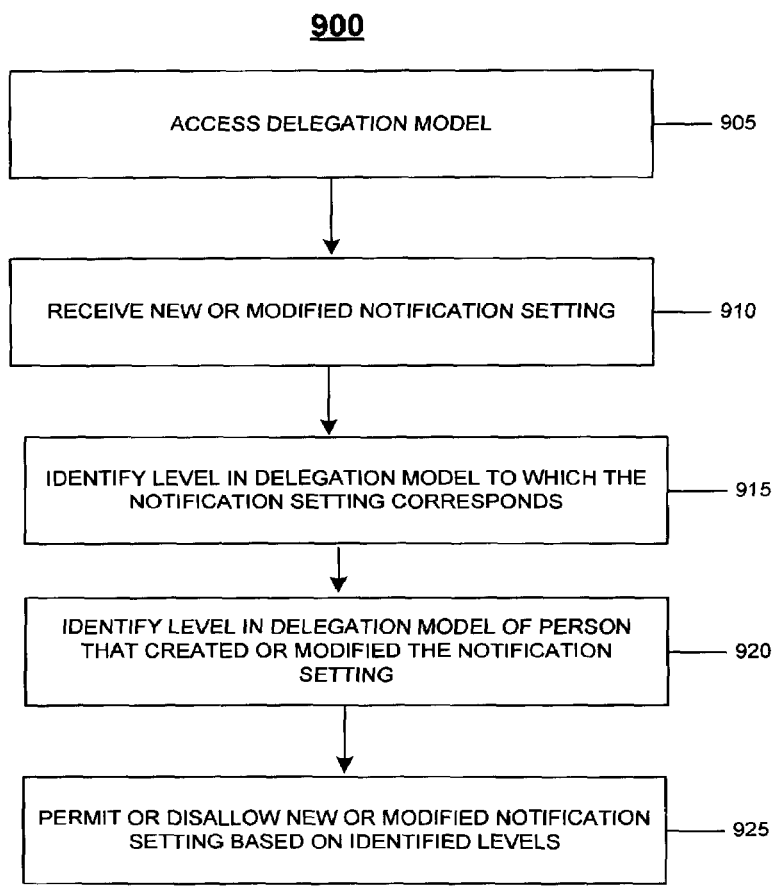
FIG. 9 is a flow chart of a process for modifying notification setting information based on a delegation model.

FIG. 9 is a flow chart of a process 900 for modifying notification setting information based on a delegation model, such as the delegation model 800 of FIG. 8. The delegation model is used to determine if the modifications to the notification settings are permissible. The process 900 begins when a delegation model is accessed (step 905) and a new or modified notification setting is received (step 910).

A level of the delegation model corresponding to the notification setting that is being modified is identified (step 915). For example, using the delegation model 800, if the received notification setting corresponds to a government regulation, then the top level 805 of the delegation model 800 is identified. A level of the delegation model corresponding to the person that created or modified the received notification setting is identified (step 920). For example, if the notification setting is received from an employer of a person to which the notification setting is to apply, then the middle level 810 of the delegation model 800 is identified.

Based on the identified levels of the delegation model for the notification setting and its creator, the new or modified notification setting is permitted or disallowed (step 925). More particularly, if the level of the person who created or modified the notification setting is higher than or equal to the level of the notification setting that is being modified, then the notification setting is permitted. However, if the level of the person who created or modified the notification setting is lower than the level of the notification setting that is being modified, then the notification setting is disallowed.

Figure 10:
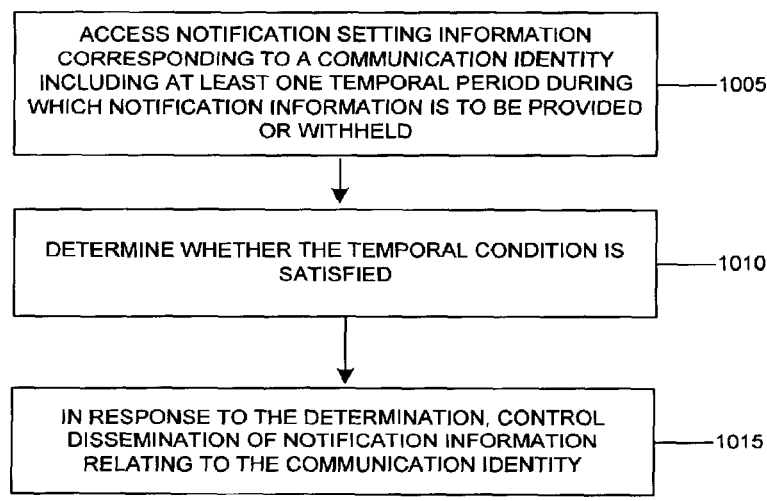
FIG. 10 is a flow chart of a process for controlling dissemination of notification information corresponding to a communications identity.

FIG. 10 is a flow chart of an exemplary process 1000 for providing notification information corresponding to a communications identity. The communications identity may be an instant messaging identity or a mobile telephone. The notification information may be on-line presence information for an instant messaging system or geographic location of a mobile telephone. The process 1000 includes accessing notification setting information corresponding to a communications identity that includes at least one temporal condition that specifies a time period during which notification information is to be provided or withheld (step 1005). A determination is made as to whether the temporal condition is satisfied (step 1010). In other words, a determination is made as to whether the current time and date are within the time period of the temporal condition.

In response to the determination, the dissemination of notification information relating to the communications identity is controlled (step 1015). For example, if the temporal condition is satisfied and the notification setting information indicates that notification information is to be provided, then notification information is provided. Likewise, if the temporal condition is satisfied and the notification setting information indicates that the notification information is to be withheld, then the notification information is withheld. On the other hand, if the temporal condition is not satisfied, then the notification setting information is not applied.

Withholding notification information includes not disseminating notification as well as preventing other users from obtaining the notification information. For example, if the notification setting information indicates that notification information is to be withheld, then incoming communications associated with the communications identity may be detected, and the communications identity may be alerted to the incoming communications. The incoming communications may be attempts to determine the notification information of the communications identity, such as the online presence or the geographical location of the communications identity, and such attempts to determine the notification information may be denied.

When notification information is to be withheld, participant lists that include the communications identity are passively configured such that the participant lists persistently conceal the status of the communications identity. For example, the participant lists may be configured to indicate that the communications identity is not available to communicate. As another example, the participant lists may be configured to indicate that availability information for the communications identity is unknown. Alternatively or additionally, the participant lists may be configured to indicate that the communications identity is not logged onto an instant message system used by the communications identity even when the communications identity actually is logged onto the instant message system Sending a message while notification information is withheld reveals the ability to communicate. If an attempt is made to send a message from the communications identity when the temporal condition is satisfied and the notification setting information indicates that notification information is to be withheld, a prompt may be displayed to alert the communications identity that the availability of the communications identity to communicate will be revealed when the message is sent.

Figure 11A:
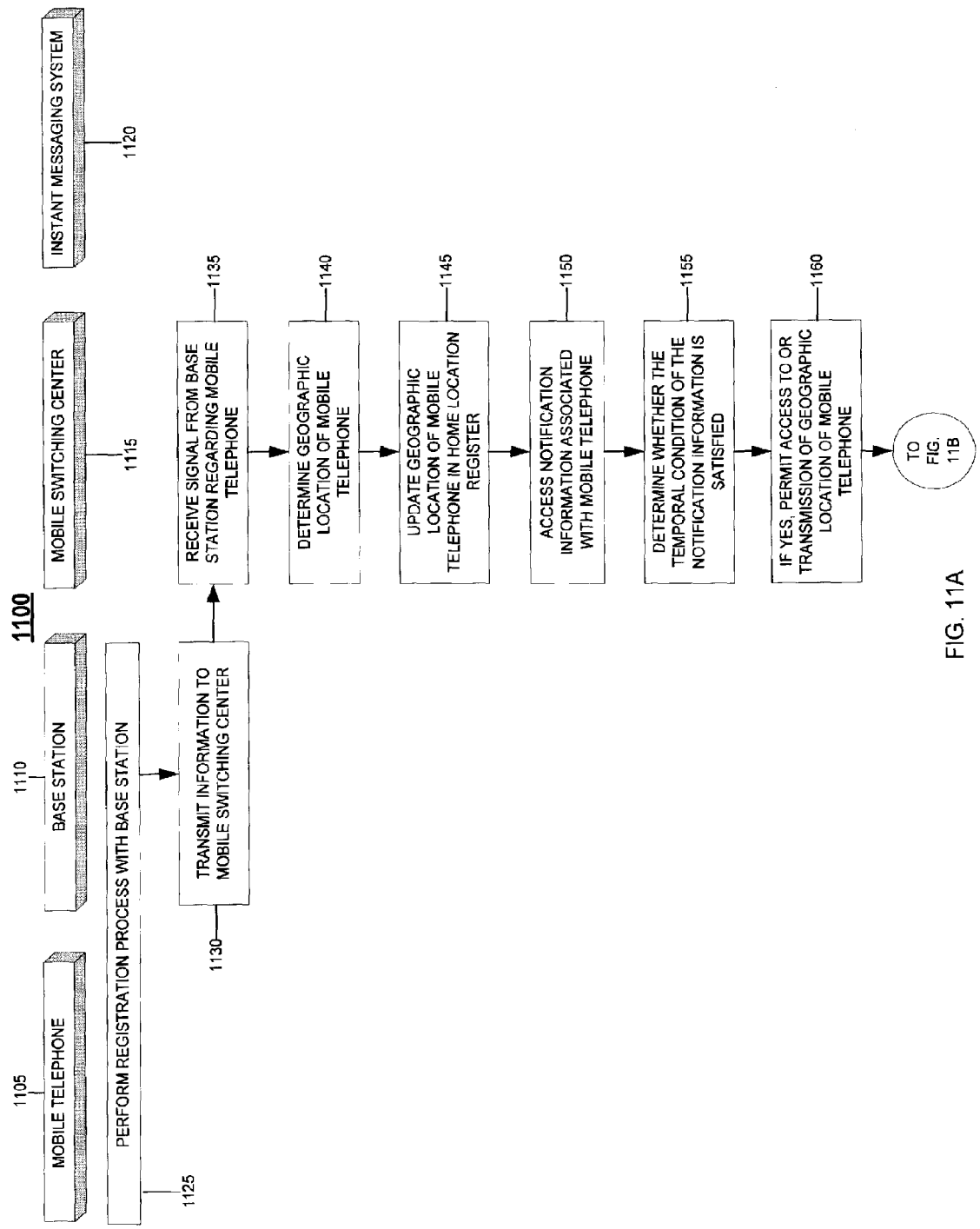
FIGS. 11A and 11B are diagrams illustrating an exemplary process for transmitting a notification of a geographic location of a user to a communications identity.
Figure 11B:
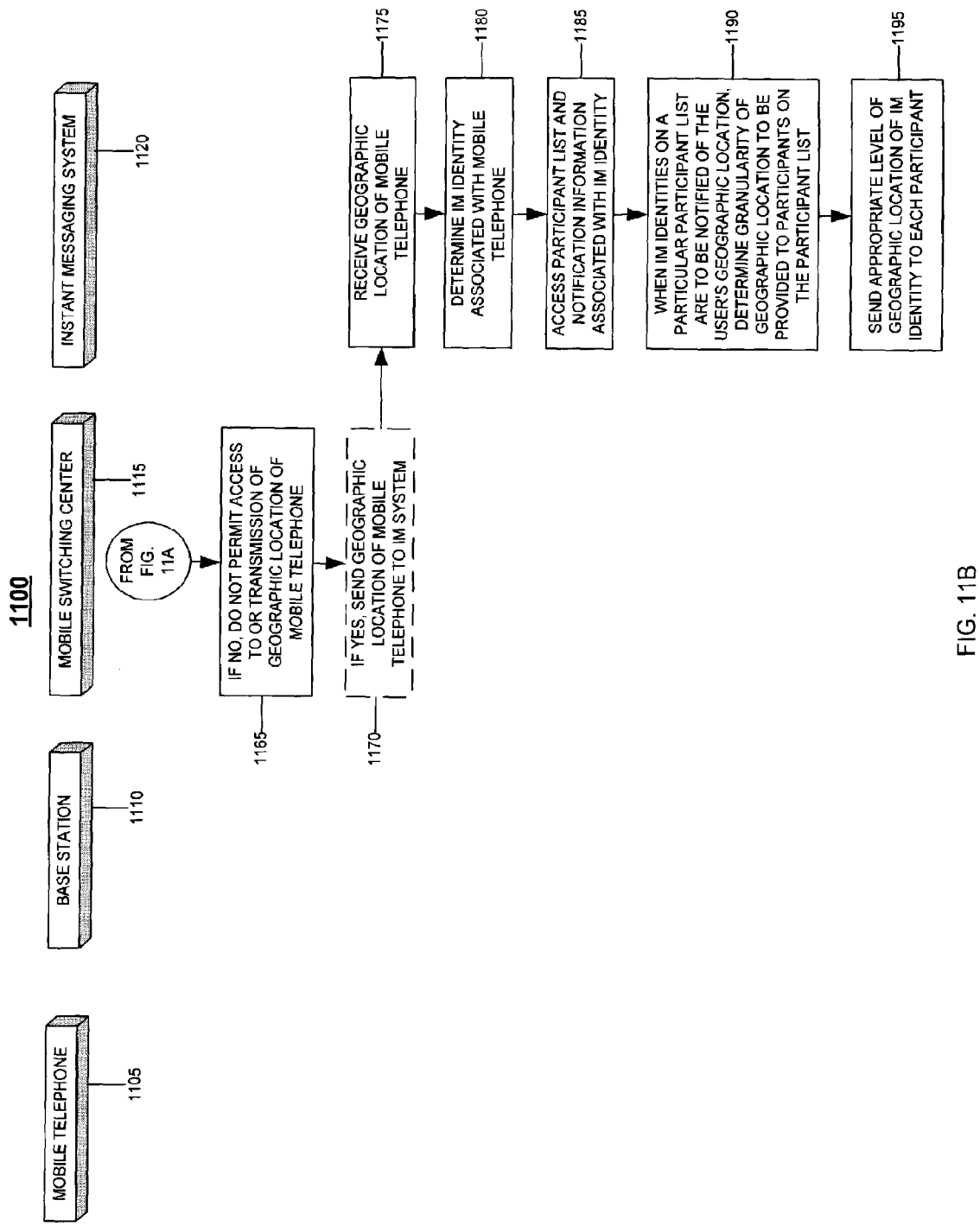

FIGS. 11A and 11B show a process 1100 for transmitting a notification of geographic location of a mobile telephone. Execution of the process 1100 also may result in the optional display of the geographic location of the mobile telephone on instant messaging participant lists. The process 1100 involves a mobile telephone 1105, a base station 1110, a mobile switching center 1115, and an instant messaging system 1120. The mobile switching center 1115 combines the functionality of the mobile switching center 230 and the gateway mobile switching center 240 of FIG. 2A in that the mobile switching center 1115 can both route mobile telephone calls and access the instant messaging system 1120.

The process 1100 begins when the mobile telephone 1105 performs a registration process with the base station 1110 (step 1125). After the mobile telephone 1105 has registered with the base station 1110, the mobile telephone is permitted to place calls through the base station. To do so, the mobile telephone 1105 transmits information to the base station 1110, which in turn transmits the information to the mobile switching center 1115 (step 1130). The mobile switching center 1115 receives the signal from the base station 1110 regarding the mobile telephone 1105 (step 1135).

The mobile switching center 1115 uses the information received from the base station 1110 to determine the geographic location of the mobile telephone (step 1140). Each mobile switching center 1115 receives signals from multiple base stations 1110, and each base station 1110 covers a particular geographic area. By determining the base station 1110 from which the information was received, the mobile switching center 1115 determines the general geographic location of the mobile telephone 1105. In another implementation, the distance that the information traveled from the mobile telephone 1105 to a base station 1110 may be determined from the time taken for the information to travel from the mobile telephone 1105 to a base station 1110. When the distance to one base station 1110 is determined, the geographic location of the mobile telephone 1105 may be specified to a point on a circle centered at the base station 1110 with a radius equal to the distance traveled by the information. When the distance to two base stations 1110 is determined, triangulation may be used to identify two possible locations of the mobile telephone 1105. When the distance to greater than two base stations 1110 is determined, triangulation may be used to identify the exact location of the mobile telephone 1105. In another implementation, the mobile telephone 1105 includes a GPS receiver that may be used to determine the geographic location of the mobile telephone 1105.

The geographic location of the mobile telephone 1105 is updated by the mobile switching center 1115 in a home location register (step 1145). The home location register stores the geographic location of all mobile telephones 1105 that communicate with the mobile switching center 1115.

The mobile switching center 1115 accesses notification settings associated with the mobile telephone 1105 (step 1150). The notification settings indicate how the determined geographic location of the mobile telephone 1105 is to be disseminated. The mobile switching center 1115 determines whether the notification settings indicate that the geographic location of the mobile telephone 1105 should be shared (step 1155). To do so, the mobile switching center 1115 determines if the temporal conditions of the notification settings are satisfied. The mobile switching center 1115 also determines if the notification settings indicate that the geographic location is to be shared or kept private during the specified time periods.

If the notification settings indicate that the geographic location should be disseminated, then the mobile switching center 1115 permits access to or transmission of the geographic location of the mobile telephone 1105 (step 1160). Otherwise, the mobile switching center 1115 does not permit access to or transmission of the geographic location of the mobile telephone 1105 (step 1165).

If the notification settings indicate that the geographic location should be disseminated, then the mobile switching center 1115 also may send the geographic location of the mobile telephone 1105 to the instant messaging system 1120 (step 1170). The instant messaging system 1120 receives the geographic location of the mobile telephone 1105 (step 1175). The instant messaging system 1120 then determines an instant messaging identity associated with the mobile telephone 1105 (step 1180). In one implementation, the instant messaging system 1120 maintains a table of mobile telephone numbers and instant messaging identities that may be used to determine the instant messaging identity associated with the mobile telephone 1105. The instant messaging system 1120 accesses a participant list and notification settings associated with the instant messaging identity (step 1185).

When the notification settings indicate that instant messaging identities on the participant list are to be notified of the geographic location of the mobile telephone 1105, then the granularity of the geographic location to be provided to the instant messaging identities is determined (step 1190). For example, as discussed above, the granularity of the geographic location may be a street address, a city, a metropolitan area, an area of a metropolitan area, a region of a country, or a country. The instant messaging system 1120 may permit the instant messaging identity to which the geographic location applies or a recipient of the geographic location to control the granularity of the geographic location. In such cases, the instant messaging system 1120 determines the appropriate granularity for the geographic location from the settings specified by the IM identity or the recipient. The instant messaging system 1120 also sends the appropriate level of geographic location information for the instant messaging identity corresponding to the mobile telephone 1105 to the instant messaging identities on the participant list (step 1195).

Figure 12:
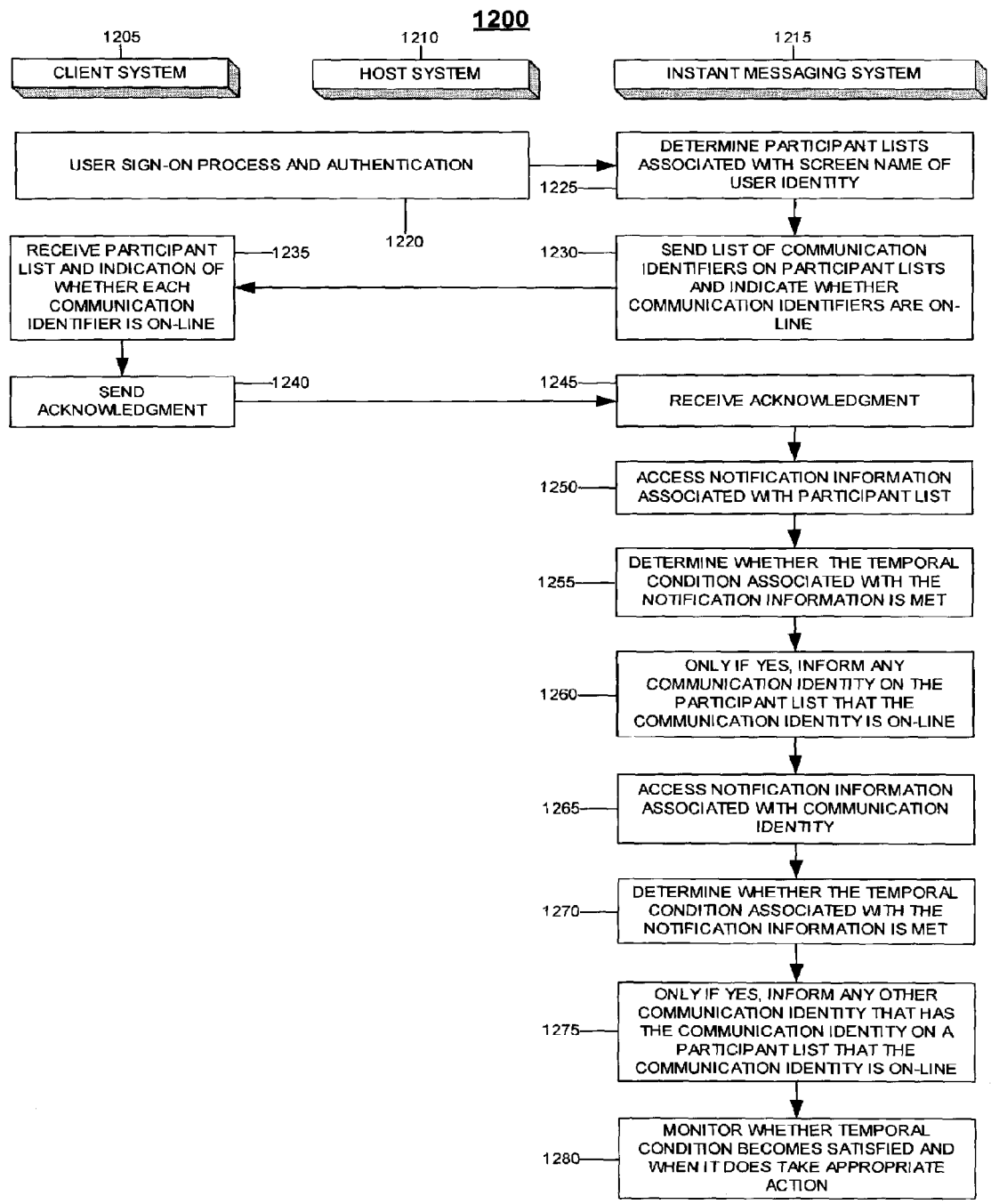
FIG. 12 is a diagram showing an exemplary process for transmitting a notification of on-line presence of a user to a communications identity.

FIG. 12 illustrates a process 1200 for transmitting a notification of on-line presence. The process 1200 involves a client system 1205, a host system 1210, and an instant messaging system 1215. In one example, the client system 1205 may be an implementation of computer 150a or 150b of FIG. 1 that includes software for accessing the host system 1210. The process 1200 begins when a user of the client system 1205 begins a sign-on and authentication process with the host system 1210 (step 1220). The host system 1210 provides the user of the client system 1205 with access to a network on which the instant messaging system 1215 is located. The user of the client system 1205 may then log into the instant messaging system 1215. The user is identified on the instant messaging system by a unique screen name. The instant messaging system 1215 determines participant lists associated with the screen name of the user (step 1225).

The instant messaging system 1215 sends the client system 1205 a list of communications identities on participant lists associated with the user with indications of whether the communications identities are on-line (step 1230). The client system 1205 receives the participant lists with the corresponding indications of whether the included communications identities are on-line (step 1235). The client system 1205 sends an acknowledgement of the list of communications identities (step 1240), which is received by the instant messaging system 1215 (step 1245).

The instant messaging system 1215 accesses notification setting information associated with a participant list associated with the user of the client system 1205 (step 1250). The notification setting information includes at least one temporal condition, and a determination is made as to whether the temporal condition is satisfied (step 1255). If so, the instant messaging system informs any communications identity on the participant list for which the notification information was accessed that the communications identity corresponding to the user of the client system 1205 is on-line (step 1260).

The instant messaging system 1215 also accesses notification setting information associated with the communications identity corresponding to the user of the client system 1205 (step 1265). A determination is made as to whether the temporal condition of the notification setting information is satisfied (step 1270). If so, the instant messaging system informs any communications identity that includes the communications identity corresponding to the user of the client system 1205 on a participant list that the communications identity corresponding to the user is on-line (step 1275).

If the temporal conditions associated with the notification setting information corresponding to the participant list or to the communications identity of the user of the client system 1205 is not satisfied, then the temporal condition is monitored until satisfied. When the temporal condition becomes satisfied, appropriate action to provide or withhold notification information is taken (step 1280).

Figure 13:
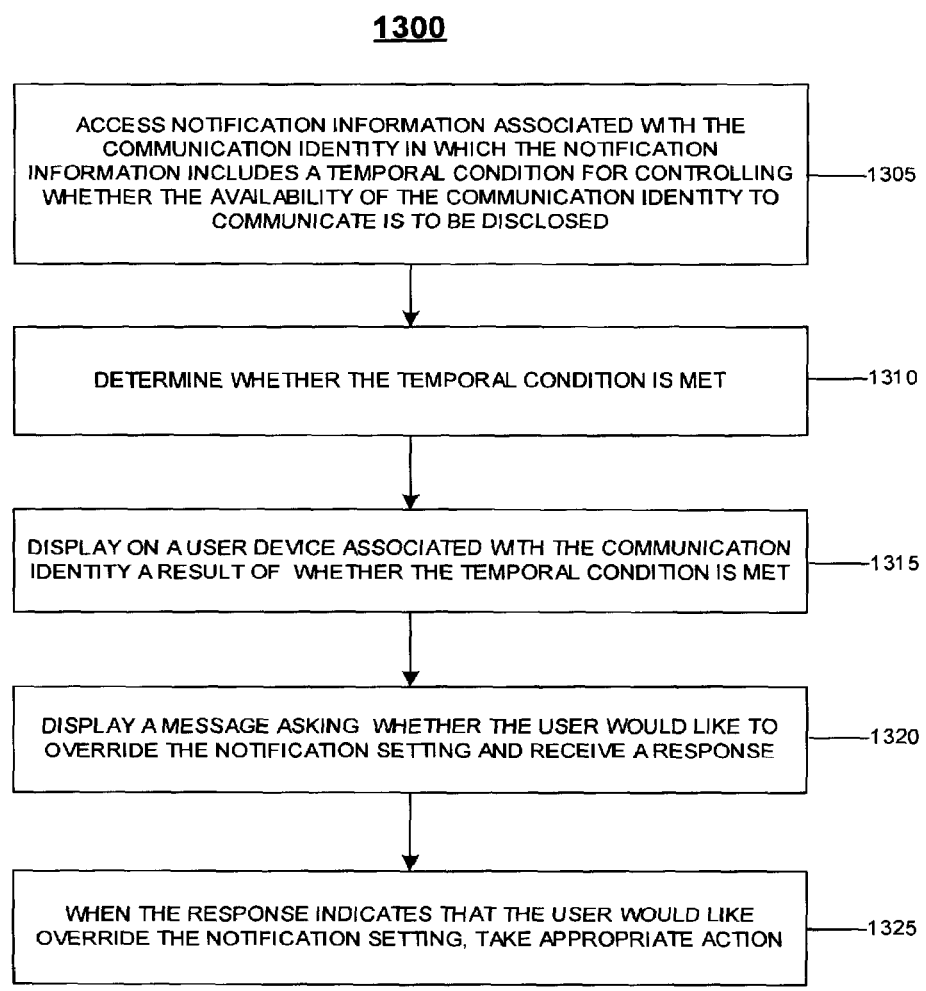
FIG. 13 is a flow chart of a process for enabling a user to override applicable notification settings.

FIG. 13 is a flow chart of a process 1300 for overriding notification settings. The process 1300 may be performed by a processor in the cellular system 110 of FIG. 1 in response to the detection of the registration process of a mobile telephone the cellular system or by a processor in the instant messaging system 140 of FIG. 1 in response to the sign-on of a user to the instant messaging system. The registration process or the sign-on of a user establishes a communications identity that is used to access the cellular system or the instant messaging system. The process 1300 begins when notification settings associated with the communications identity are accessed (step 1305). The notification settings include a temporal condition for controlling whether the availability of the communications identity to communicate is disclosed. For example, the temporal condition specifies periods of time during which the availability of the communications identity to communicate with the cellular system or the instant messaging system is disclosed or withheld.

The processor makes a determination as to whether the temporal condition is met (step 1310). A result of whether the temporal condition is satisfied is displayed on a user device associated with the communications identity (step 1315). For example, if the communications identity is communicating with a mobile telephone, the result of the determination may be displayed on a screen included in the mobile telephone. If the communications identity is communicating with the instant messaging system, then the result may be displayed on a display of the computer used to access the instant messaging system. A name for the period of time specified by the temporal condition may be displayed on the user device associated with the communications identity.

A message asking whether the user would like to override the notification setting is displayed, and a response to the message is received (step 1320). When the response indicates that the communications identity would like to override the notification setting, appropriate action is taken (step 1325). For example, the availability of the communications identity to communicate may be provided or withheld regardless of whether the temporal condition is met. More particularly, if the notification setting indicates that the availability is to be withheld, then overriding the notification setting may include providing the availability. Similarly, if the notification setting indicates that the availability is to be provided, then overriding the notification setting may include withholding the availability. Overriding the notification information may include replacing or modifying the notification information to reflect how the user would like the notification information to be disseminated.

In one implementation, a new notification setting that specifies the manner in which the availability of the communications identity is provided or withheld to override the existing notification setting may be created, and the new notification setting may permanently replace the existing notification setting. In one such implementation, the new notification setting may be applied during the same temporal period of the existing notification setting, or the new notification setting may be applied at all times. In this manner, the notification setting information may be easily changed.

Mobile telephones communicating with a cellular system are used throughout as examples of mobile communications devices whose geographic location may be determined and disseminated. In general, geographic locations of any mobile communications or computing device, such as a laptop computer, a PDA, or a mobile telephone, may be determined and disseminated to indicate the locations of the users. The geographic location of a mobile communications or computing device may be determined from the device itself, from access points (e.g. cellular system base stations or wireless access points) used by the device, or from explicit user declaration.

Similarly, computers and an instant messaging service are used as examples of communications devices and communications services that may be accessed by the communications devices. Use of a communications device to access the communications service indicates the availability of a user of the communications device to communicate, or the presence of the user. Another example of a communications device and a communications service are a mobile telephone and a cellular system. Use of the mobile telephone may both indicate the presence of a user of the mobile telephone and the geographic location of the user.

Users of the mobile communications devices and the communications devices may be people or machines under the control of people. For example, a communications device may be configured to communicate with a communications service without explicit use by a person, though the person may control how the communications device communicates with the communications service, and presence and geographic location for the communications device may be disseminated. For example, a mobile telephone may communicate with a cellular system without explicit use by a person to ensure that calls are properly routed, and such communication may be used for determining and disseminating the presence and the geographic location of the person. As another example, presence information and the geographic location of a system for automatically sending and receiving instant messages, which is known as an instant messaging robot or a bot, may be controlled and disseminated.

Instant messaging programs typically allow instant message senders to communicate in real-time with each other in a variety of ways. For example, many instant messaging programs allow instant message senders to send text as an instant message, to transfer files, and to communicate by voice. Examples of instant messaging communication applications include AIM (America Online Instant Messenger), AOL (America Online) Buddy List and Instant Messages which is an aspect of many client communication applications provided by AOL, Yahoo Messenger, MSN Messenger, and ICQ, among others. Although discussed above primarily with respect to instant message applications, other implementations are contemplated for providing similar functionality in platforms and on-line applications. For example, the techniques and concepts may be applied to an animated avatar that acts as an information assistant to convey news, weather, and other information to a user of a computer system or a computing device.

The techniques and concepts generally have been described in the context of an instant messaging system that uses an instant messaging host system to facilitate the instant messaging communication between instant message senders and instant message recipients. Other instant message implementations are contemplated, such as an instant message service in which instant messages are exchanged directly between an instant message sender system and an instant message recipient system.

For example, although the examples above are given in an instant message context, other communications systems with similar attributes may be used. For example, multiple personalities may be used in a chat room or in e-mail communications. Also, the user interface may be a viewable interface, an audible interface, a tactile interface, or a combination of these.

The user interfaces are described as having windows for which a user may control the display position of each window on a display device. A user's control over the display position of a window may include, for example, indirect or direct control of the coordinates of the display device at which the window is positioned, the size of the window, and the shape of the window. Alternatively, any of the windows described herein may be implemented as a pane of a graphical user interface in which the pane is displayed in a fixed position on a display device.

The described systems, methods, and techniques may be implemented in digital electronic circuitry, computer hardware, firmware, software, or in combinations of these elements. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made without departing from spirit and scope of the claims. For example, the steps of the disclosed techniques and concepts may be performed in a different order and/or the components in the disclosed systems may be combined in a different manner and/or replaced or supplemented by other components. As another example, a screen name is used throughout to represent a unique identifier of an account, but any other unique identifier of an account may be used to identify an account. Other implementations are within the scope of the following claims.

What is claimed is:

1. A method comprising:
   maintaining settings for disseminating information associated with a user to one or more other users, the maintained settings including one or more settings that prevent users associated with the one or more settings from receiving notification information associated with the user;
   receiving notification information associated with the user;
   detecting delivery of a message from the user to another user of the one or more users;
   identifying at least one setting from the one or more settings that prevents the another user from receiving the notification information;
   in response to detecting delivery of the message from the user to the another user of the one or more users, overriding the at least one setting that prevents the another user from receiving the notification information; and
   disseminating the received notification information to the another user in accordance with the override of the at least one setting that prevents the another user from receiving the notification information.

2. The method of claim 1, wherein the override of the at least one setting is specific to the another user from the plurality of other users.

3. The method of claim 1, wherein the override of the at least one setting allows one or more additional users of the plurality of other users to be able to communicate with the user, regardless of the settings.

4. The method of claim 1, wherein disseminating the received notification information to the another user in accordance with the override of the at least one setting, comprises disseminating the notification information and additional received notification information associated with the user to the another user for a predetermined period of time in accordance with a term of the override.

5. The method of claim 1, further comprising:
   providing an option for the user to cancel the override of the at least one setting; and
   detecting a selection, by the user, of the option to cancel the override of the at least one setting.

6. A non-transitory computer readable medium storing instructions thereon that, when executed by at least one processor, cause that at least one processor to perform the steps of:
   maintaining settings for providing information associated with a user to one or more other users, the maintained settings including one or more settings that prevent users associated with the one or more settings from receiving notification information associated with the user;
   receiving notification information associated with the user;
   detecting delivery of a message from the user to another user of the one or more users;
   identifying at least one setting from the one or more settings that prevents the another user from receiving the notification information;
   in response to detecting delivery of the message from the user to the another user of the one or more users, overriding the at least one setting that prevents the another user from receiving the notification information; and
   disseminating the received notification information to the another user in accordance with the override of the at least one setting that prevents the another user from receiving the notification information.

7. The non-transitory computer readable medium of claim 6, wherein the override of the at least one setting is specific to the another user from the plurality of other users.

8. The non-transitory computer readable medium of claim 6, wherein the override of the at least one setting allows one or more additional users of the plurality of other users to be able to communicate with the user, regardless of the settings.

9. The non-transitory computer readable medium of claim 6, wherein disseminating the received notification information to the another user in accordance with the override of the at least one setting, comprises disseminating the notification information and additional received notification information associated with the user to the another for a predetermined period of time in accordance with a term of the override.

10. A system comprising a server configured to:
   maintain settings for providing information associated with a user to one or more other users, the maintained settings including one or more settings that prevent users associated with the one or more settings from receiving notification information associated with the user;
   receive notification information associated with the user;
   detect delivery of a message from the user to another user of the one or more users;
   identify at least one setting from the one or more settings that prevents the another user from receiving the notification information;
   in response to detecting delivery of the message from the user to the another user of the one or more users, override the at least one setting that prevents the another user from receiving the notification information; and
   disseminate the received notification information to the another user in accordance with the override of the at least one setting that prevents the another user from receiving the notification information.

11. The system of claim 10, wherein the override of the at least one setting is specific to the another user from the plurality of other users.

12. The system of claim 10, wherein the override of the at least one setting allows one or more additional users of the plurality of other users to be able to communicate with the user, regardless of the settings.

13. The system of claim 10, wherein disseminating the received notification information to the another user in accordance with the override of the at least one setting, comprises disseminating the notification information and additional received notification information associate with the user to the another user for a predetermined period of time in accordance with a term of the override.

14. The system of claim 10, wherein the system is implemented by a mobile device.

15. The method of claim 1, further comprising providing an option for the user to modify the override.

16. The method of claim 1, further comprising, prior to disseminating the received notification information to the another user in accordance with the override, providing a notification to the user of the override of the at least one setting that prevents the another user from receiving the notification information.

17. The method of claim 16, wherein providing the notification to the user of the override of the at least one setting further comprises providing, prior to disseminating the received notification information to the another user in accordance with the override, an option for the user to confirm the override of the at least one setting that prevents the another user from receiving the notification information.

* * * * *